(12) United States Patent
Chen et al.

(10) Patent No.: US 11,797,465 B2
(45) Date of Patent: Oct. 24, 2023

(54) RESOURCE RECOMMENDATION SYSTEM

(71) Applicant: Citrix Systems, Inc., Fort Lauderdale, FL (US)

(72) Inventors: Ze Chen, Nanjing (CN); Ke Xu, Nanjing (CN); Xiao Zhang, Nanjing (CN); Zongpeng Qiao, Nanjing (CN)

(*) Notice: Subject to any disclaimer, the term of this patent is extended or adjusted under 35 U.S.C. 154(b) by 139 days.

(21) Appl. No.: 17/352,421

(22) Filed: Jun. 21, 2021

(65) Prior Publication Data

US 2022/0382698 A1 Dec. 1, 2022

Related U.S. Application Data

(63) Continuation of application No. PCT/CN2021/097092, filed on May 31, 2021.

(51) Int. Cl.
G06F 13/38 (2006.01)
G06F 13/10 (2006.01)
G06F 9/451 (2018.01)
G06F 9/50 (2006.01)

(52) U.S. Cl.
CPC ............ G06F 13/385 (2013.01); G06F 9/452 (2018.02); G06F 9/5027 (2013.01); G06F 13/105 (2013.01)

(58) Field of Classification Search
None
See application file for complete search history.

(56) References Cited

U.S. PATENT DOCUMENTS 6,286,060 B1* 9/2001 DiGiorgio .......... G06F 13/4022
710/51
9,003,080 B2* 4/2015 Bachrany ................ G06F 3/00
710/37
2011/0205965 A1* 8/2011 Sprigg .................. G06F 9/4411
709/201
2012/0173979 A1 7/2012 Lee
2012/0254898 A1* 10/2012 Nakata ................. G06F 9/4411
719/327
2013/0246513 A1* 9/2013 Zaveri ..................... G06F 3/067
709/203

(Continued)

FOREIGN PATENT DOCUMENTS

CN 107736045 A 2/2018
CN 111919179 A 11/2020

OTHER PUBLICATIONS

International Search Report and Written Opinion dated Feb. 28, 2022 for International Patent Application No. PCT/CN2021/097092.

*Primary Examiner* — Henry Tsai
*Assistant Examiner* — Aurangzeb Hassan

(57) ABSTRACT

In accordance with one disclosed method, a client device may be caused to present a user interface for an application, the user interface enabling selective access to a plurality of resources via the client device. A state of a peripheral device that is connectable to the client device may be determined and, based at least in part on the state of the peripheral device, at least a first resource, from among the plurality of resources, may be identified with which the peripheral device can interact. Based at least in part on the identifying of the first resource, the user interface may be caused to include at least a first selectable user interface element that, when selected, causes the client device to access to the first resource so as to enable the peripheral device to interact with the first resource.

20 Claims, 15 Drawing Sheets

(56) References Cited

U.S. PATENT DOCUMENTS

| | | | |
|---|---|---|---|
| 2013/0332923 A1* | 12/2013 | Shaposhnik | G06F 21/57 |
| | | | 718/1 |
| 2015/0339216 A1* | 11/2015 | Wade | G06F 11/3664 |
| | | | 714/38.1 |
| 2015/0346931 A1 | 12/2015 | Moran et al. | |
| 2016/0098362 A1* | 4/2016 | Summers | H04W 52/027 |
| | | | 710/73 |
| 2017/0364887 A1* | 12/2017 | Dullings | G07G 1/0009 |
| 2018/0088804 A1 | 3/2018 | Mummidi et al. | |
| 2019/0212911 A1* | 7/2019 | Lin | G06F 3/04886 |
| 2021/0197076 A1* | 7/2021 | Pelissier | G06F 13/4291 |

* cited by examiner

RESOURCE RECOMMENDATION SYSTEM

CROSS-REFERENCE TO RELATED APPLICATIONS

This application is a continuation of and claims the benefit under 35 U.S.C. § 120 and 35 U.S.C. § 365(c) to International Application PCT/CN2021/097092, entitled RESOURCE RECOMMENDATION SYSTEM, with an international filing date of May 31, 2021, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves causing a client device to present a user interface for an application, the user interface enabling selective access to a plurality of resources via the client device; determining a state of a peripheral device that is connectable to the client device; identifying, based at least in part on the state of the peripheral device, at least a first resource, from among the plurality of resources, with which the peripheral device can interact; and causing, based at least in part on the identifying of the first resource, the user interface to include at least a first selectable user interface element that, when selected, causes the client device to access to the first resource so as to enable the peripheral device to interact with the first resource.

In some embodiments, a system includes at least one processor, and at least one computer-readable medium encoded with instructions which, when executed by the at least one processor, cause the system to cause a client device to present a user interface for an application, the user interface enabling selective access to a plurality of resources via the client device, to determine a state of a peripheral device that is connectable to the client device, to identify, based at least in part on the state of the peripheral device, at least a first resource, from among the plurality of resources, with which the peripheral device can interact, and to cause, based at least in part on the identifying of the first resource, the user interface to include at least a first selectable user interface element that, when selected, causes the client device to access to the first resource so as to enable the peripheral device to interact with the first resource.

In some embodiments, at least one non-transitory computer-readable medium is encoded with instructions which, when executed by at least one processor of a system, cause the system to cause a client device to present a user interface for an application, the user interface enabling selective access to a plurality of resources via the client device, to determine a state of a peripheral device that is connectable to the client device, to identify, based at least in part on the state of the peripheral device, at least a first resource of the plurality of resources with which the peripheral device can interact, and to cause, based at least in part on the identifying of the first resource, the user interface to include at least a first selectable user interface element that, when selected, causes the client device to access to the first resource so as to enable the peripheral device to interact with the first resource.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
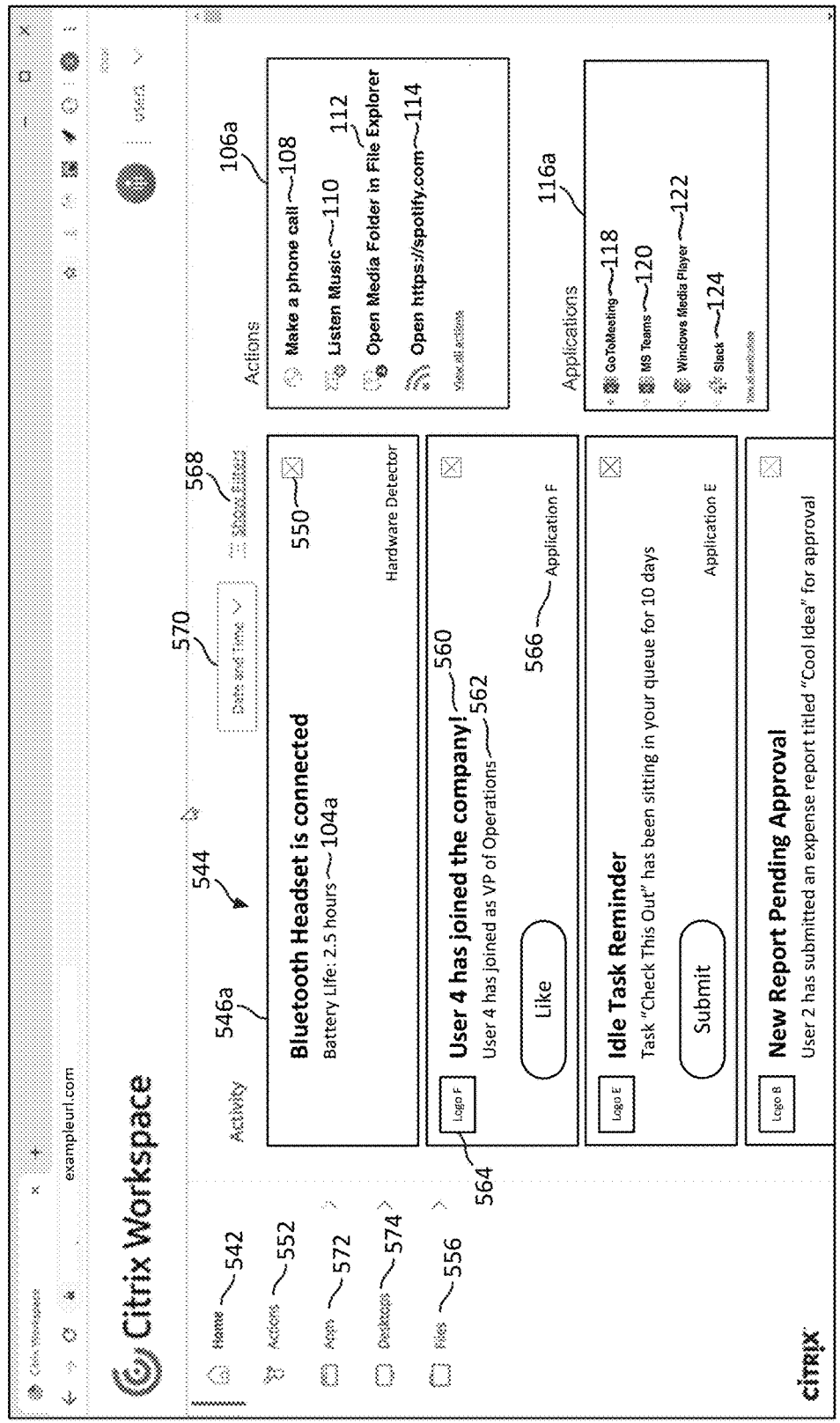
FIG. 1A shows a first example display screen illustrating how selectable user interface elements enabling access to resources may be presented, based on a determined state of a peripheral device, on a user interface for a multi-resource access system in accordance with some aspects of the present disclosure.

For purposes of reading the description of the various embodiments below, the following descriptions of the sections of the specification and their respective contents may be helpful:

Section A provides an introduction to example embodiments of a resource recommendation system in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of the example embodiments of the resource recommendation system introduced in Section A; and Section G describes example implementations of methods, systems/devices, and computer-readable media in accordance with the present disclosure.

A. Introduction to Illustrative Embodiments of a Resource Recommendation System

A multi-resource access system, such as that offered by the Citrix Workspace™ family of products, provides significant benefits, as it allows a user to access any of a number of disparate resources from a streamlined, unified user interface on a client device. An example implementation of such a multi-resource access system 500 is described below (in Section E) in connection with FIGS. 5A-D. As Section E describes, one or more resource management services 502 may manage and streamline access by one or more clients 202 to one or more resource feeds 504 (via one or more gateway services 506) and/or one or more software-as-a-service (SaaS) applications 508. The resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc.

As described in connection with FIGS. 5B, the resource management service(s) 502 may employ an identity provider 510 to authenticate the identity of a user of a client 202 and, following authentication, may identify one or more resources the user 524 is authorized to access. In response to the user 524 selecting one of the identified resources, the resource management service(s) 502 may send appropriate access credentials to the requesting client 202, and the client 202 may then use those credentials to access the selected resource in the manner described below. More specifically, in the example implementation described, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202. The resource access application 522 and associated components may thus provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

As also explained in connection with FIG. 5B, the resource feed service 518 may be responsible for determining the various resources that are to be made accessible to the client device 202, e.g., based on the identity of the user 524 of the client device 202, and causing a user interface of the client device 202 (e.g., via the resource access application 522) to present a collection of selectable icons or other elements corresponding to accessible resources. For resources other than local applications and the SaaS application(s) 508, upon the user 524 selecting a user interface element for one of the available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a user interface element for a local application, the resource access application 522 may cause the selected local application to launch on the client 202. When the user 524 selects a user interface element for a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

Figure 5A:
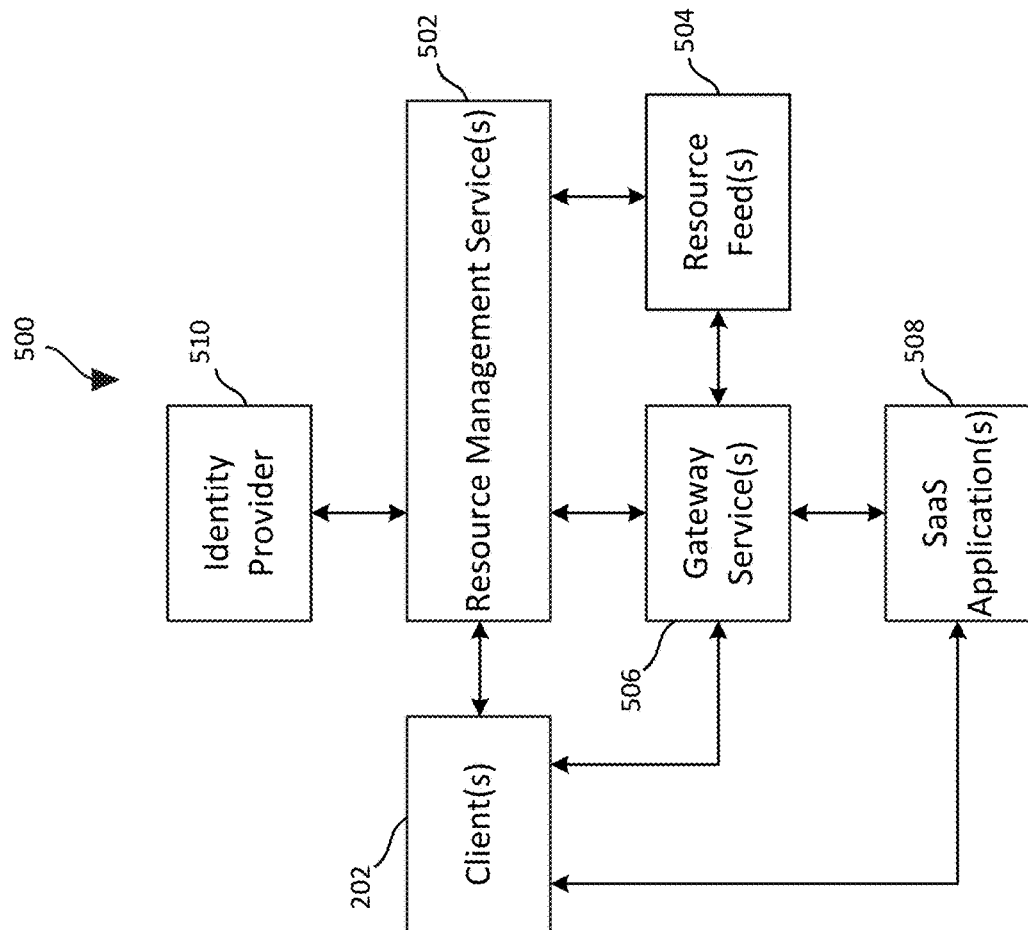
FIG. 5A is a block diagram of an example system in which resource management services may manage and streamline access by clients to resource feeds (via one or more gateway services) and/or software-as-a-service (SaaS) applications.
Figure 5B:
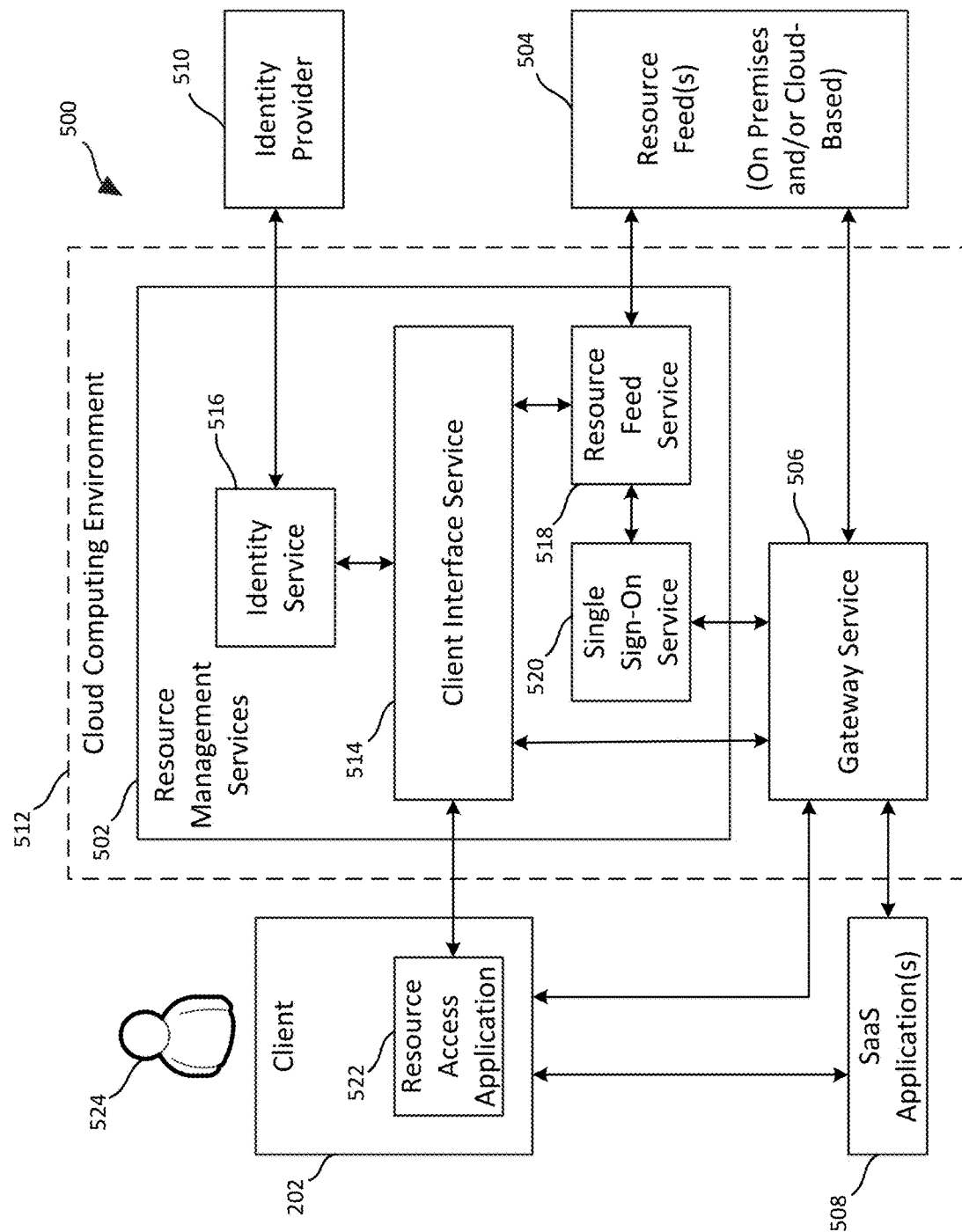
FIG. 5B is a block diagram showing an example implementation of the system shown in FIG. 5A in which various resource management services as well as a gateway service are located within a cloud computing environment.
Figure 5C:
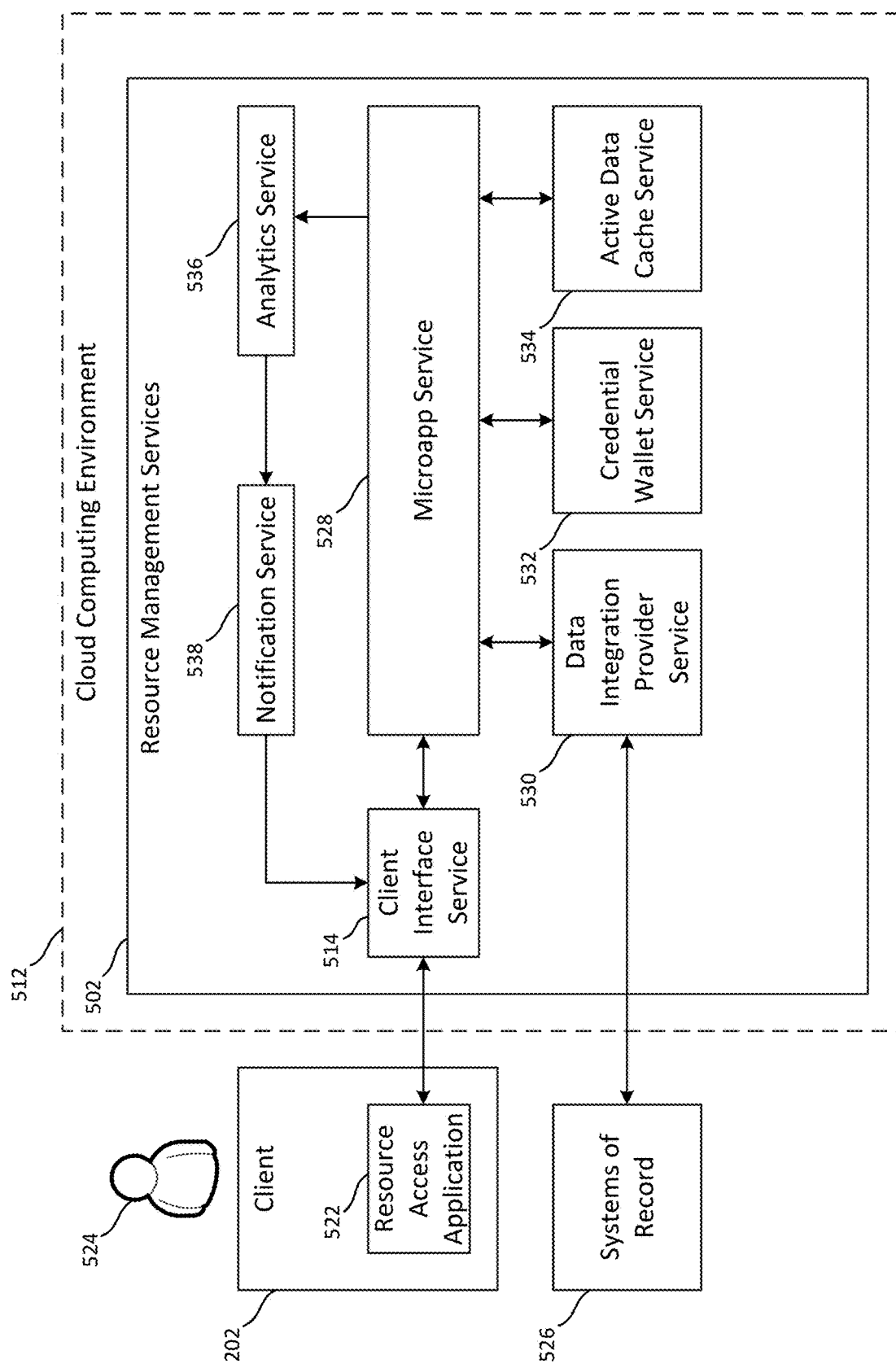
FIG. 5C is a block diagram similar to that shown in FIG. 5B but in which the available resources are represented by a single box labeled "systems of record," and further in which several different services are included among the resource management services.
Figure 5D:
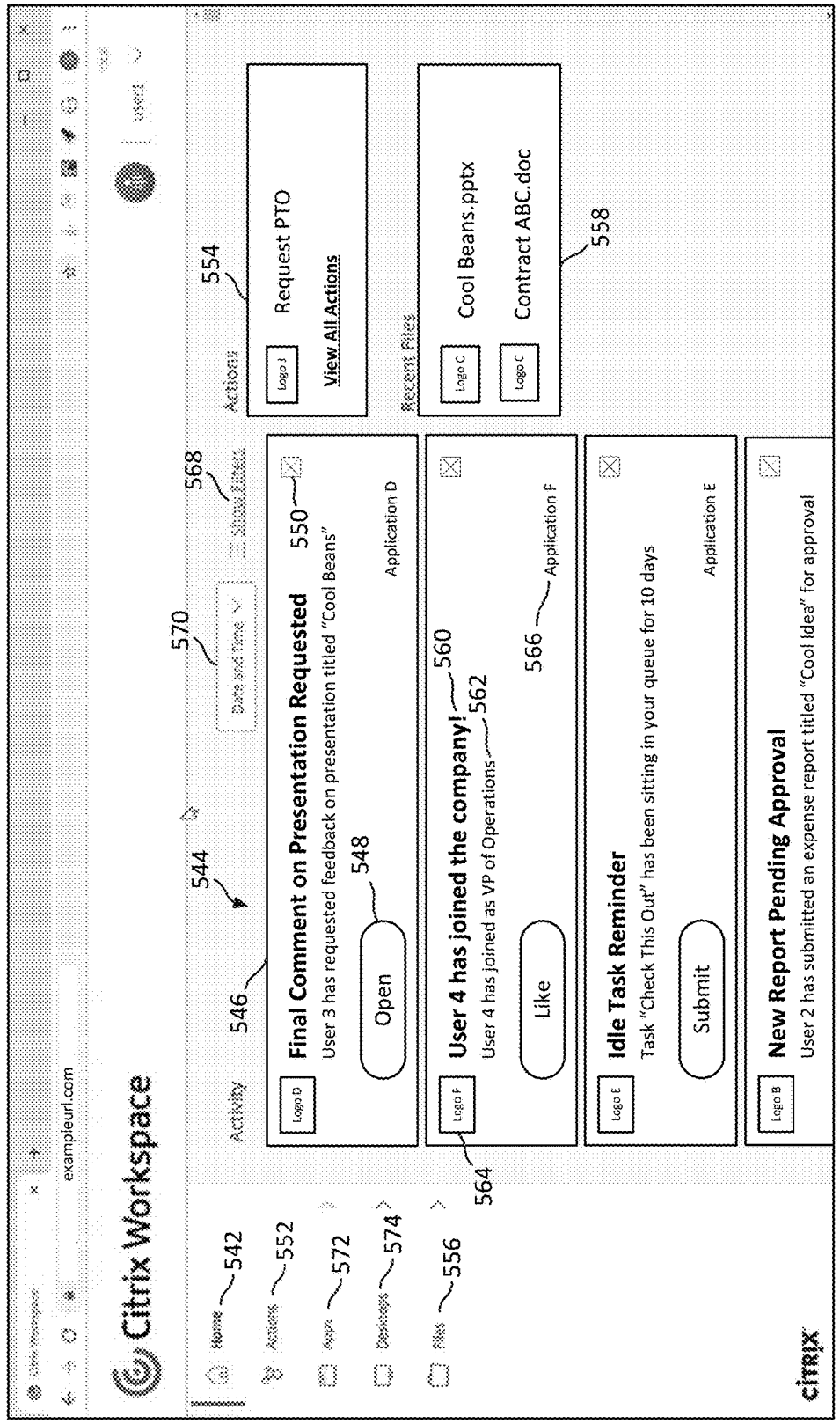
FIG. 5D shows how a display screen may appear when an intelligent activity feed feature of a multi-resource management system, such as that shown in FIG. 5C, is employed.

FIG. 5D shows an example of how a display screen 540 presented by the resource access application 522 (shown in FIG. 5C) may appear when a user 524 is logged on to the multi-resource access system 500. In the illustrated example, in addition to providing a user interface that enables access to various resource, as described above, the display screen 540 includes an activity feed 544 that includes a plurality of notifications 546 about respective events that occurred within various applications to which the user has access rights. An example implementation that employs resource management services 502 capable of providing an activity feed 544 like that shown in FIG. 5D is described below in connection with FIG. 5C.

As explained in more detail in Section E, various resources may be accessed through the user interface provided by the screen 540 shown in FIG. 5D by clicking on or otherwise selecting one or more user interface elements. For example, in some embodiments, the user 524 may access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. Additionally, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops. And still further, in some implementations, one or more micro applications (or "microapps") for certain systems of record 526 may additionally or alternatively be accessed, e.g., by selecting an action element 548 in a notifications 546 and/or by selecting a desired action, e.g., via a drop-down menu accessible using the "action" user interface element 552 or by selecting a desired action from a list 554 of recently and/or commonly used microapp actions. Details concerning an example implementation of a microapp service 528 capable of enabling the use of such microapps is described below in connection with FIG. 5C.

The inventors have recognized and appreciated that, while the multi-resource access system 500 already provides significant benefits, the system 500 can be made even more useful by taking into account state changes with respect to the hardware peripherals connected to the client device 202, e.g., by detecting that a new peripheral has been connected to the client device 202 or that a peripheral that was already connected to the client device 202 has experienced a particular state change, and presenting one or more user interface elements on the display screen 540 that, when selected, cause the client device 202 to automatically access one or more particular resources with which the peripheral in question is configured to interact. The system 500 may thus be configured to effectively predict, based on detected state changes of peripheral devices of the client device 202, that particular resources are likely to be of interest to the user 524 operating the client device 202, and may select user interface elements enabling access to those resources for presentation on the display screen 540. Several illustrative examples of circumstances in which user interface elements for particular resources may be selected based on detected states of certain peripherals are described below.

FIG. 1A shows a first example display screen 102a illustrating how several potentially relevant user interface elements may be presented within a user interface presented by the resource access application 522 in response to a determination that a Bluetooth headset has been connected to the client device 202. As illustrated, in some implementations, the resource access application 522 may generate and present a notification 546a at the top of the activity feed 544 to indicate the peripheral state change that has been detected and perhaps to provide some useful information concerning the newly detected peripheral, such as text 104a indicating the remaining battery life of the device. Further, as shown, upon detection of the newly-connected Bluetooth headset, an actions list 106a may be presented that includes selectable user interface elements 108, 110, 112, 114 for various operations that involve managed resources (e.g., one or more virtual applications and/or desktops, one or more microapps, one or more file repositories and/or file sharing systems, one or more browsers, one or more internet enabled devices or sensors, one or more local applications installed on the client 202, and/or one or more SaaS applications 508 to which the user 524 has subscribed) with which the Bluetooth headset is configured to interact. Additionally or alternatively, as also shown, an applications list 116a may be presented that includes selectable user interface elements 118, 120, 122, 124 for various managed applications (e.g., SaaS and web applications, virtual Windows applications, virtual Linux applications, mobile applications, local applications, etc.) with which the Bluetooth headset is configured to interact.

As explained in more detail below, selecting one of the selectable user interface elements 108, 110, 112, 114, 118, 120, 122, 124 may cause the client device 202 to automatically access one or more of the resources managed by the multi-resource access system 500 so as to enable the newly-connected Bluetooth headset to interact with such resource(s). Automatically presenting selectable user interface elements 108, 110, 112, 114, 118, 120, 122, 124 corresponding to resources with which the newly-detected Bluetooth headset is capable of interacting may improve the user experience by making it easier for the user 524 to take appropriate actions, or to find and launch appropriate applications, to take advantage of the newly connected hardware. In other words, the system may be configured to predict what that user is likely to want to do based on the detected hardware state change, and present selectable user interface elements that allow the user to do those particular things. Additional examples of display screens 102b, 102c that may be presented as a result of other hardware state changes are described below in connection with FIGS. 1D and 1E, following the description of FIGS. 1B and 1C.

Figure 1B:
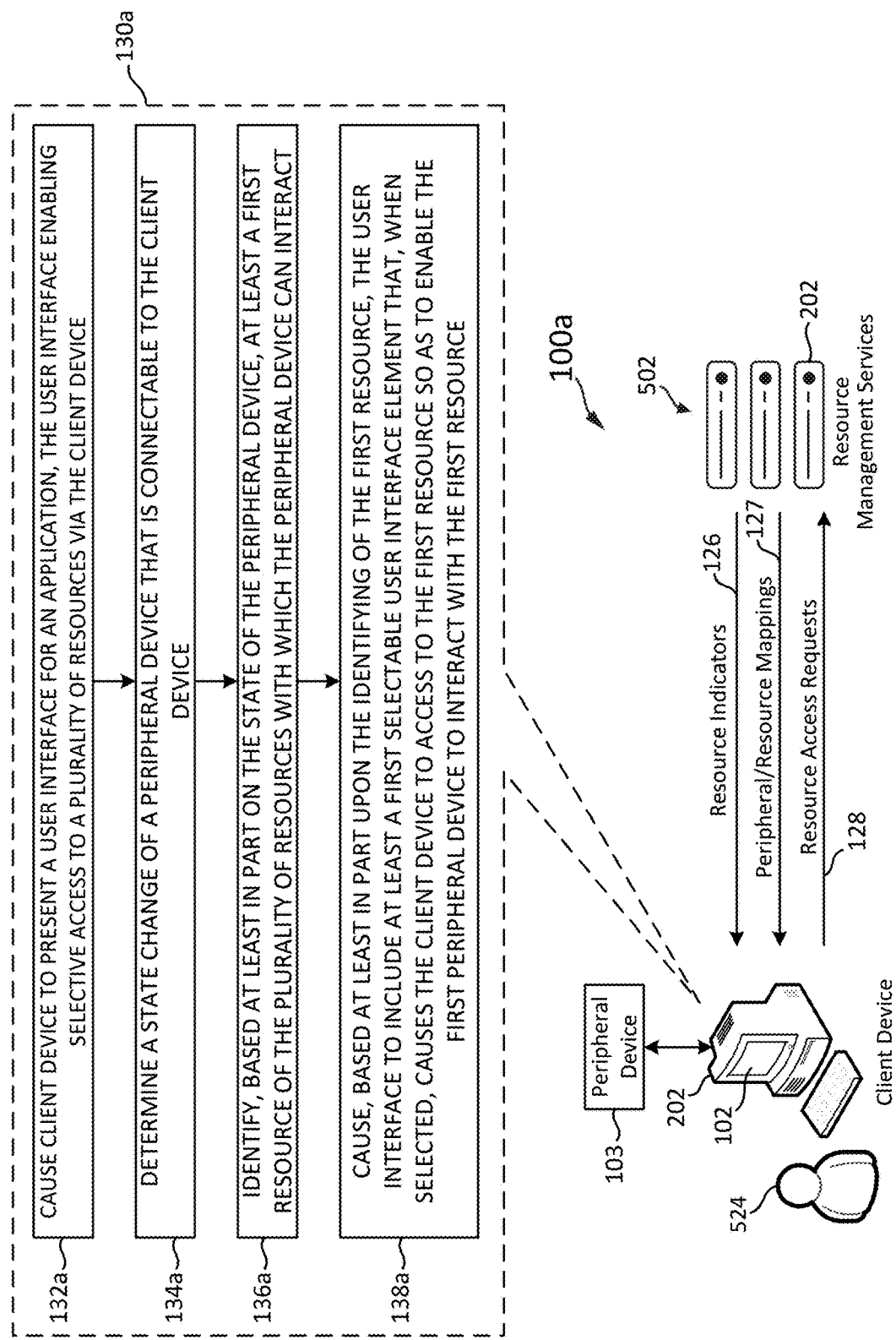
FIG. 1B shows a first example implementation of a resource recommendation system in accordance with some aspects of the present disclosure.
Figure 1C:
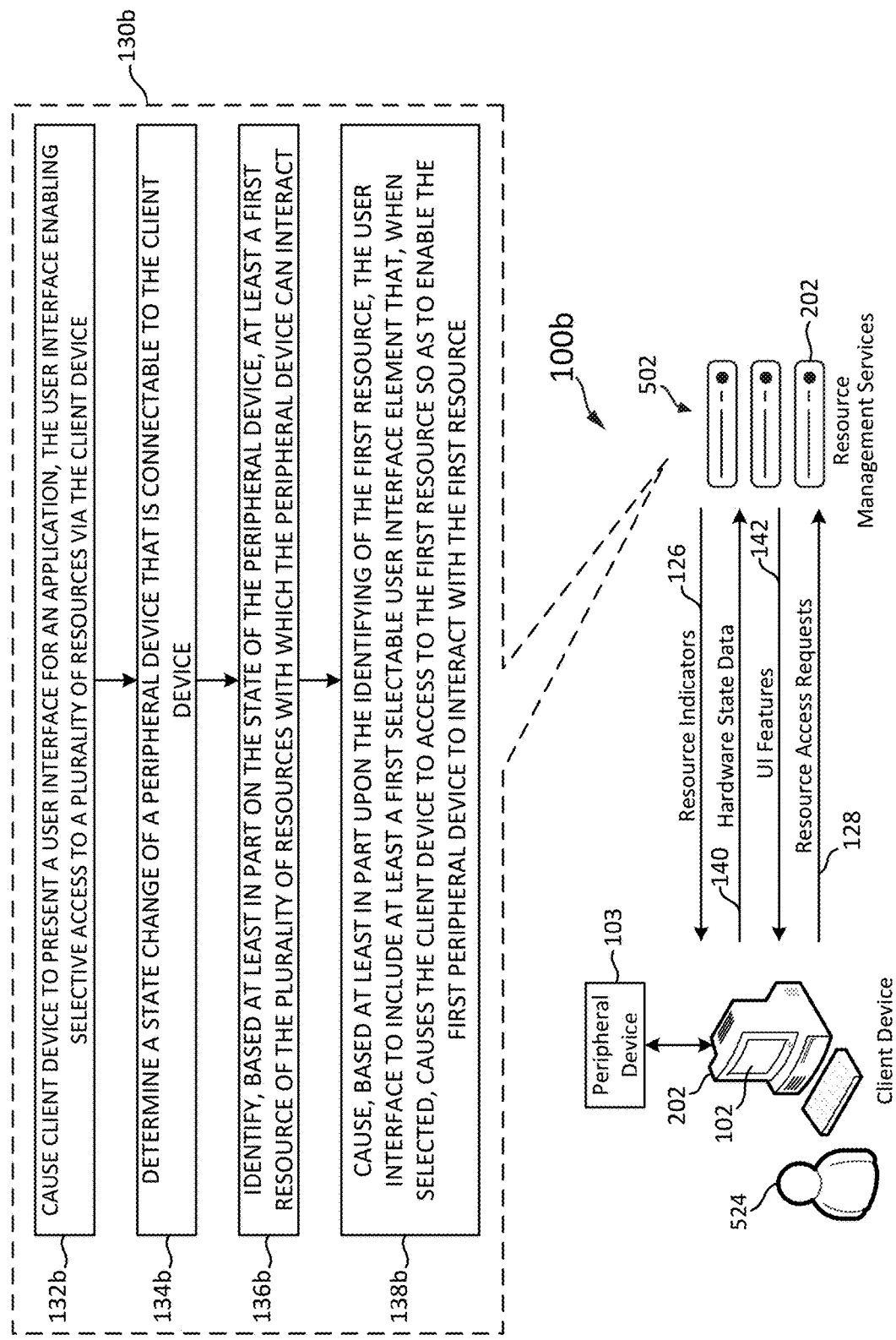
FIG. 1C shows a second example implementation of a resource recommendation system in accordance with some aspects of the present disclosure.

FIGS. 1B and 1C show two example embodiments of a resource recommendation system 100 configured in accordance with aspects of the present disclosure. As shown, the same basic routine 130a, 130b may be performed in each such embodiment, although the implementation details of the routines 130a, 130b may differ slightly in the two circumstances, primarily due to the location of the component(s) responsible for executing the routines 130a, 130b. For the resource recommendation system 100a shown in FIG. 1B, the routine 130a may be performed by one or more applications on the client device 202 (e.g., the resource access application 522 shown in FIGS. 5B and 5C). For the resource recommendation system 100b shown in FIG. 1C, on the other hand, the routine 130b may be performed by one or more server-based applications (e.g., within the resource management services 502 shown in FIGS. 5A-C).

As shown in FIG. 1B, at a step 132a of the routine 130a, the client device 202 may be caused (e.g., via the resource access application 522) to present a user interface (e.g., the display screen 540 shown in FIG. 5D) that enables a user 524 to selectively access to a plurality of resources via the client device 202. For example, as noted above, in some implementations, the resource feed service 518 (shown in FIG. 5B) may determine the various resources that are to be made accessible to the client device 202, e.g., based on the identity of the user 524 of the client device 202, and may cause a user interface of the client device 202 (e.g., via the resource access application 522) to present a collection of selectable icons or other elements corresponding to accessible resources. An arrow 126 in FIG. 1B shows how indicators of the resources available to the user 524 (e.g., as determined by the resource feed service 518) may be communicated to the client device 202 for inclusion on the user interface (e.g., via the resource access application 522).

At a step 134a of the routine 130a, a state of a peripheral device 103 connected to the client device 202 may be determined. For example, in some implementations, the resource access application 522 may receive notifications of events relating to hardware changes from the operating system of the client device 202 (e.g., user space events (uevents) from a Linux kernel or WM_DEVICECHANGE messages in a Windows operating system). Additionally or alternatively, the resource access application 522 may receive data from the peripheral devices indicative of state changes to those devices, such as a change to the remaining battery life of the device, etc. For example, as explained in more detail below, in some implementations, one or more hardware virtual drivers within the resource access application 522 may periodically or occasionally read data from the peripheral devices they interact with and, based on that data, may determine when such devices have undergone significant state changes.

At a step 136a of the routine 130a, at least a first resource of the variety of managed resources that are accessible via the client device 202 may be identified based at least in part on the determined state change of the peripheral device determined at the step 134a. For example, as noted above, when a new Bluetooth headset is connected to the client device, the resource access application 522 may identify one or more actions that could be taken that would potentially involve the newly-connected device and/or one or more applications with which the newly-connected device could potentially interact. As indicated by an arrow 127 in FIG. 1B, in some implementations, the resource management services 502 may send the client device 202 data indicative of particular actions and/or applications that are to be made available via the resource access application (e.g., by presenting one or more of the selectable user interface elements 108, 110, 112, 114, 118, 120, 122, 124 shown in FIG. 1A) in response to the detection of certain peripheral hardware state changes. Several example techniques that may be used to map potentially relevant actions and/or applications to particular peripheral hardware state changes are described in detail below.

At a step 138a of the routine 130a, the user interface presented at the step 132a may be caused, based on the first resource identified at the step 136a, to include at least a first selectable user interface element (e.g., one of the selectable user interface elements 108, 110, 112, 114, 118, 120, 122, 124 shown in FIG. 1A) that, when selected, causes the client device 202 to access the first resource. As explained above, for example, selecting one of the "action" user interface elements 108, 110, 112, 114 may cause the client device 202 to access a particular managed resource to perform a particular action, such as making a voice over internet protocol (VoIP) phone call, which action might involve interactions between the newly-connected Bluetooth headset and the accessed resource, e.g., a VoIP application. As another example, selecting one of the "application" user interface elements 118, 120, 122, 124 may cause the client device 202 to access a particular application with which the newly-connected Bluetooth headset might interact. As indicated by an arrow 128 in FIG. 1B, in response to selection of the first user interface element, the client device 202 may send a resource access request (e.g., for the first resource) to the resource management services 502. And in response to that resource access request, the resource management services 502 may enable the client device 202 to access the indicated resource (e.g., the first resource). Several example techniques the resources management services 502 can employ to provide the client device 202 with access to particular resources are described above, as well as in Section E below.

Referring next to FIG. 1C, as noted above, in the resource recommendation system 100b, one or more server-based processes, e.g., within the resource management services 502, may be responsible for executing the routine 130b. Like the routine 130a (described in connection with FIG. 1B), the routine 130b may cause the client device 202 to both (A) present a user interface for the resource access application 522 (e.g., the display screen 540 shown in FIG. 5D) that enables selective access to a plurality of resources (e.g., by causing the resource access application 522 to present selectable user interface elements corresponding to indicators of available resources, per the arrow 126 in FIG. 1C), and (B) based at least in part on a state change of a peripheral device 103 associated with the client device 202, include within that user interface at least a first selectable user interface element (e.g., one of the selectable user interface elements 108, 110, 112, 114, 118, 120, 122, 124 shown in FIG. 1A) that, when selected causes the client device 202 to access a first resource (e.g., by sending a resource access request for the first resource, per the arrow 128 in FIG. 1C, to the resource management services 502) so as to enable the peripheral device 103 to interact with the first resource.

As shown in FIG. 1C, at a step 132b of the routine 130b, the client device 202 may be caused (e.g., via instructions the resource management services 502 sends to the resource access application 522) to present a user interface (e.g., the display screen 540 shown in FIG. 5D) that enables a user 524 to selectively access to a plurality of resources via the client device 202. For example, as noted above, in some implementations, the resource feed service 518 (shown in FIG. 5B) may determine the various resources that are to be made accessible to the client device 202, e.g., based on the identity of the user 524 of the client device 202, and may cause a user interface of the client device 202 (e.g., via the resource access application 522) to present a collection of selectable icons or other elements corresponding to accessible resources. The arrow 126 in FIG. 1C shows how indicators of the resources available to the user 524 (e.g., as determined by the resource feed service 518) may be communicated to the client device 202 for inclusion on the user interface (e.g., via the resource access application 522).

At a step 134b of the routine 130b, a state of a peripheral device 103 connected to the client device 202 may be determined. For example, in some implementations, the resource access application 522 may receive notifications of events relating to hardware changes from the operating system of the client device 202 (e.g., uevents from a Linux kernel or WM_DEVICECHANGE messages in a Windows operating system), and, as indicated by an arrow 140 in FIG. 1C, may send data to the resource management services 502 indicative of those detected hardware changes. Additionally or alternatively, the resource access application 522 may receive data from the peripheral devices indicative of state changes to those devices, such as a change to the remaining battery life of the device, etc., and, as indicated by the arrow 140, may send data to the resource management services 502 indicative of those detected hardware state changes. For example, as explained in more detail below, in some implementations, one or more hardware virtual drivers within the resource access application 522 may periodically or occasionally read data from the peripheral devices they interact with and, based on that data, may determine when such devices have undergone significant state changes. In any event, the step 134b may be performed by one or more components of the resource management services 502 based on the hardware state data received per the arrow 140.

At a step 136b of the routine 130b, at least a first resource of the variety of managed resources that are accessible via the client device 202 may be identified based at least in part on the determined state change of the peripheral device determined at the step 134b. For example, as noted above, when a new Bluetooth headset is connected to the client device, the resource access application 522 may be instructed to identify one or more actions that could be taken that would potentially involve the newly-connected device and/or one or more applications with which the newly-connected device could potentially interact. Several example techniques for mapping potentially relevant actions and/or applications to particular peripheral hardware state changes are described in detail below.

At a step 138b of the routine 130b, the user interface that was caused to be presented at the step 132b may be caused, based on the first resource identified at the step 136b, to include at least a first selectable user interface element (e.g., one of the selectable user interface elements 108, 110, 112, 114, 118, 120, 122, 124 shown in FIG. 1A) that, when selected, causes the client device 202 to access the first resource. As indicated by an arrow 142 in FIG. 1C, the resource management services 502 may send to the client device 202 instructions concerning user interface (UI) features (including at least the first selectable user interface element) to include in the user interface of the resource access application 522. As explained above, selecting one of the "action" user interface elements 108, 110, 112, 114 may cause the client device 202 to access a particular managed resource to perform a particular action, such as making a VoIP phone call, which action might involve interactions between the newly-connected Bluetooth headset and the accessed resource, e.g., a VoIP application, or selecting one of the "application" user interface elements 118, 120, 122, 124 may cause the client device 202 to access a particular application with which the newly-connected Bluetooth headset might interact. As indicated by the arrow 128 in FIG. 1C, in response to selection of the first user interface element, the client device 202 may send a resource access request (e.g., for the first resource) to the resource management services 502. And in response to that resource access request (e.g., as indicated by the arrow 128), the resource management services 502 may enable the client device 202 to access the indicated resource (e.g., the first resource). Several example techniques the resources management services 502 can employ to provide the client device 202 with access to particular resources are described above, as well as in Section E below.

Figure 1D:
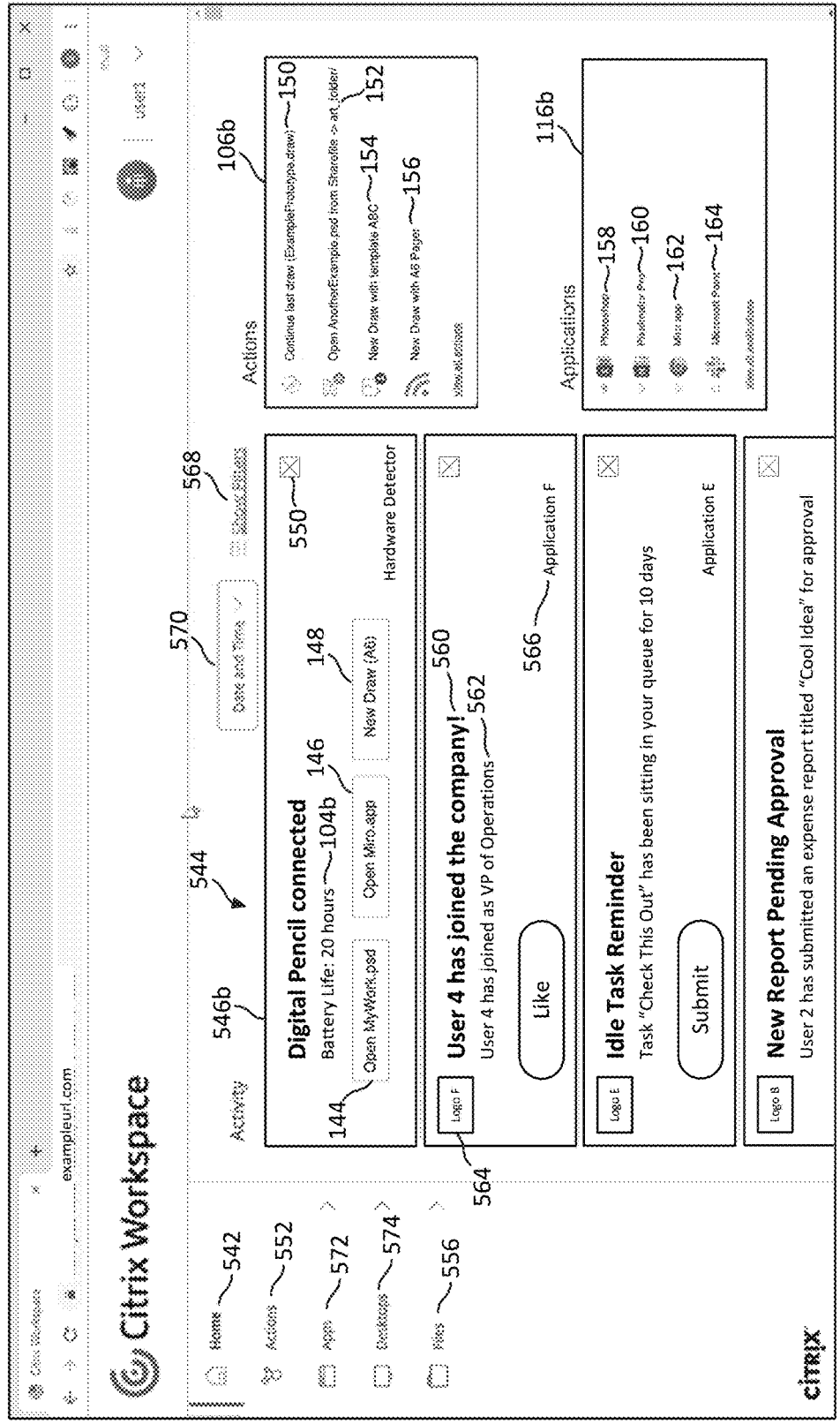
FIG. 1D shows a second example display screen illustrating how selectable user interface elements enabling access to resources may be presented, based on a determined state of a peripheral device, on a user interface for a multi-resource access system in accordance with some aspects of the present disclosure.

FIG. 1D shows a second example display screen 102b illustrating how several potentially relevant user interface elements may be presented within a user interface presented by the resource access application 522 in response to a determination that a digital pencil (sometimes alternatively referred to as a "digital pen") has been connected to the client device 202. As illustrated, in some implementations, the resource access application 522 may generate and present a notification 546b at the top of the activity feed 544 to indicate the peripheral state change that has been detected and perhaps to provide some useful information concerning the newly detected peripheral, such as text 104b indicating the remaining battery life of the device. Further, as indicated, in some implementations, the notification 546b may additionally or alternatively be caused to include one or more selectable user interface elements 144, 146, 148 for various operations that involve managed resources with which the newly-detected digital pencil is configured to interact and/or one or more managed applications with which the digital pencil is configured to interact.

In addition, upon detection of the newly-connected digital pencil, an actions list 106b may be presented that includes selectable user interface elements 150, 152, 154, 156 for various operations that involve managed resources with which the digital pencil is configured to interact. Additionally or alternatively, an applications list 116b may be presented that includes selectable user interface elements 158, 160, 162, 164 for various managed applications with which the digital pencil is configured to interact.

Selecting one of the user interface elements 144, 146, 148, 150, 152, 154, 156, 158, 160, 162, 164 may cause the client device 202 to automatically access one or more of the resources managed by the multi-resource access system 500 so as to enable the newly-connected digital pencil to interact with such resource(s). Automatically presenting user interface elements 144, 146, 148, 150, 152, 154, 156, 158, 160, 162, 164 corresponding to resources with which the newly-detected digital pencil is capable of interacting may improve the user experience by making it easier for the user 524 to take appropriate actions, or to find and launch appropriate applications, to take advantage of the newly connected hardware. In other words, the system may be configured to predict what that user is likely to want to do based on the detected hardware state change, and present selectable user interface elements that allow the user to do those particular things.

Figure 1E:
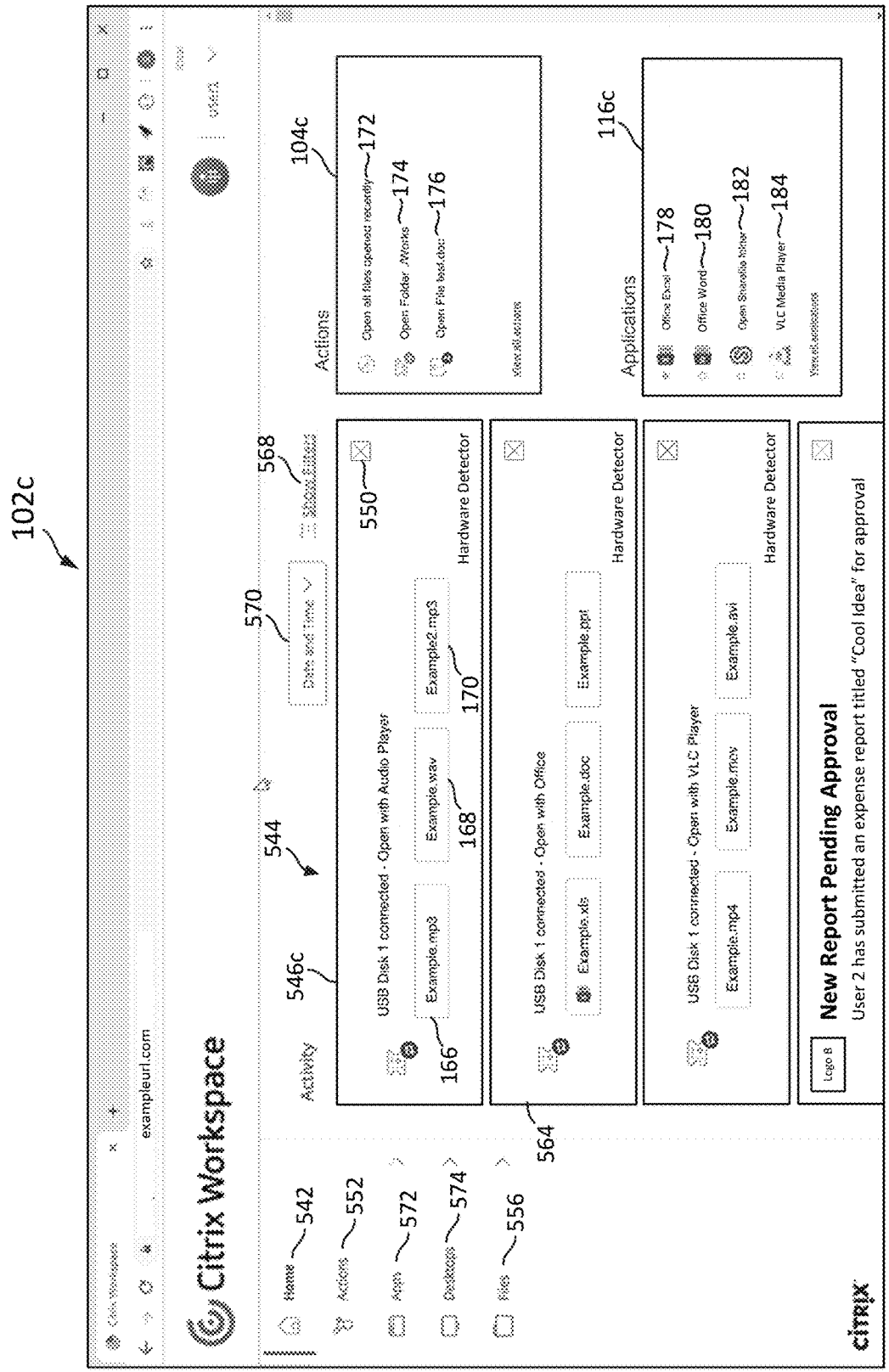
FIG. 1E shows a third example display screen illustrating how selectable user interface elements enabling access to resources may be presented, based on a determined state of a peripheral device, on a user interface for a multi-resource access system in accordance with some aspects of the present disclosure.

FIG. 1E shows a third example display screen 102c illustrating how several potentially relevant user interface elements may be presented within a user interface presented by the resource access application 522 in response to a determination that a universal serial bus (USB) disk has been connected to the client device 202. As illustrated, in some implementations, the resource access application 522 may generate and present one or more notification 546c at the top of the activity feed 544 to indicate the peripheral state change that has been detected. Further, as indicated, in some implementations, the notification(s) 546c may additionally or alternatively be caused to include one or more selectable user interface elements 166, 168, 170 for various operations that involve managed resources with which the newly-detected USB disk is configured to interact and/or one or more managed applications with which the USB disk is configured to interact. In the illustrated example, separate notifications 546c are generated for respective resources (i.e., "Audio Player," "Office" and "VLC Player") that are configured to interact with the USB disk, and for each such resource, several user interface elements for actions relating to particular files detected on the USB disk are presented. Accordingly, in the illustrated example, selection of one of the user interface elements 166, 168, 170 may cause the indicated resource (i.e., the Audio Player) to be accessed, and may also cause the indicated file to be opened using that resource. As explained in more detail below, the identity of the files corresponding to the user interface elements 166, 168, 170 may be determined, for example, by using a hardware virtual driver to determine a set of most-recently used files on the USB disk and respective user interface elements may be presented for those files. As illustrated, the indicated files may be matched with resources that are capable of opening them, such as using an audio player to open an .mp3 file, using an Office application to open an .xls file, using a video player to open an .mp4 file, etc.

In addition, upon detection of the newly-connected USB disk, an actions list 106c may be presented that includes selectable user interface elements 172, 174, 176 for various operations that involve managed resources with which the USB disk is configured to interact. Additionally or alternatively, an applications list 116c may be presented that includes selectable user interface elements 178, 180, 182, 184 for various managed applications with which the USB disk is configured to interact.

Selecting one of the user interface elements 166, 168, 170, 172, 174, 176, 178, 180, 182, 184 may cause the client device 202 to automatically access one or more of the resources managed by the multi-resource access system 500 so as to enable the newly-connected USB disk to interact with such resource(s). Automatically presenting user interface elements 166, 168, 170, 172, 174, 176, 178, 180, 182, 184 corresponding to resources with which the newly-detected USB disk is capable of interacting may improve the user experience by making it easier for the user 524 to take appropriate actions, or to find and launch appropriate applications, to take advantage of the newly connected hardware. In other words, the system may be configured to predict what that user is likely to want to do based on the detected hardware state change, and present selectable user interface elements that allow the user to do those particular things.

Additional details and example implementations of embodiments of the present disclosure are set forth below in Section F, following a description of example systems and network environments in which such embodiments may be deployed.

B. Network Environment

Figure 2:
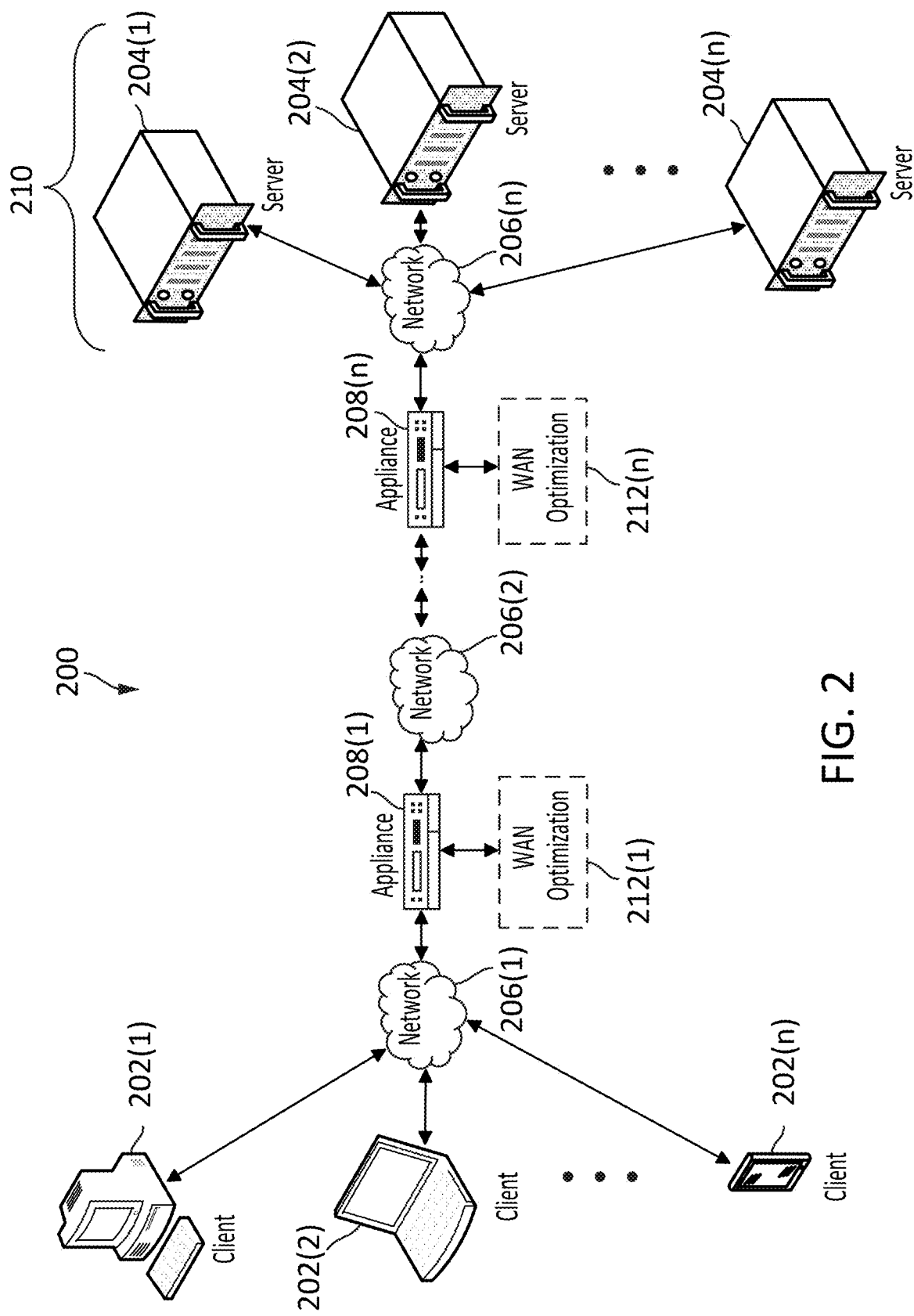
FIG. 2 is a diagram of a network environment in which some embodiments of the context-based microapp action recommendation system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), interne protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
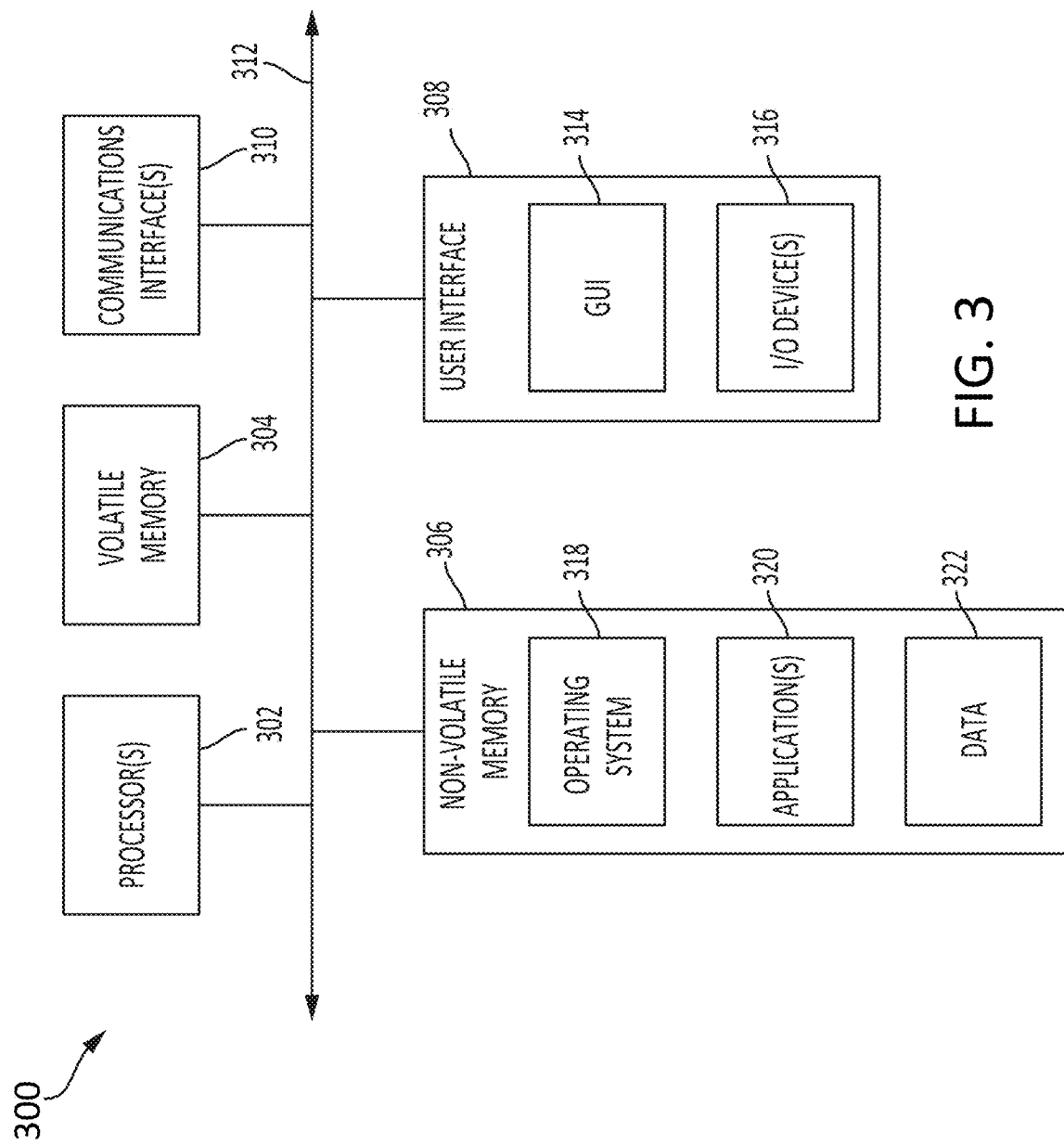
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
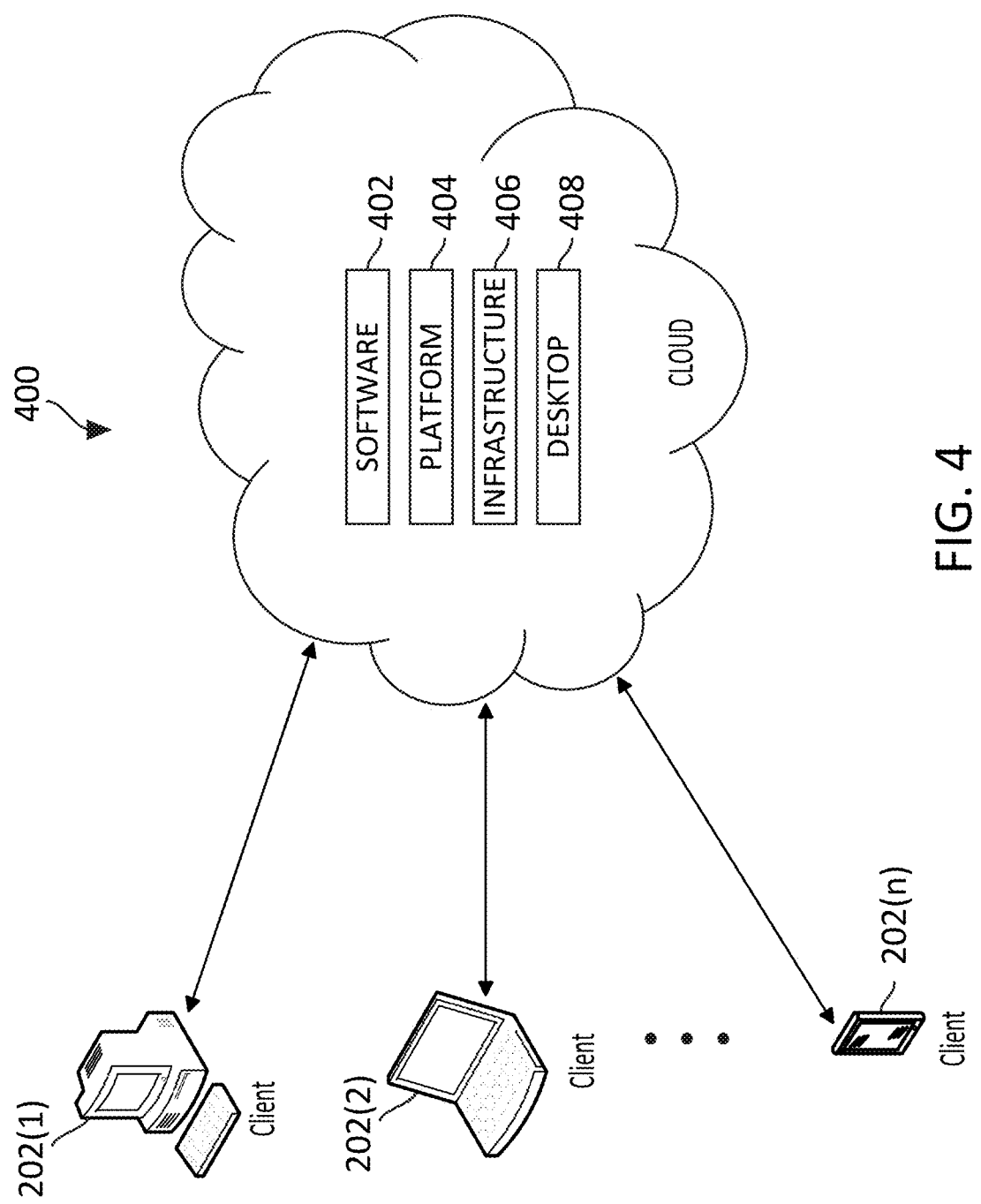
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Wash., Azure IaaS provided by Microsoft Corporation or Redmond, Wash., RACKSPACE CLOUD provided by Rackspace US, Inc., of San Antonio, Tex., Google Compute Engine provided by Google Inc. of Mountain View, Calif., and RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile® from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5I)), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

Figure 6:
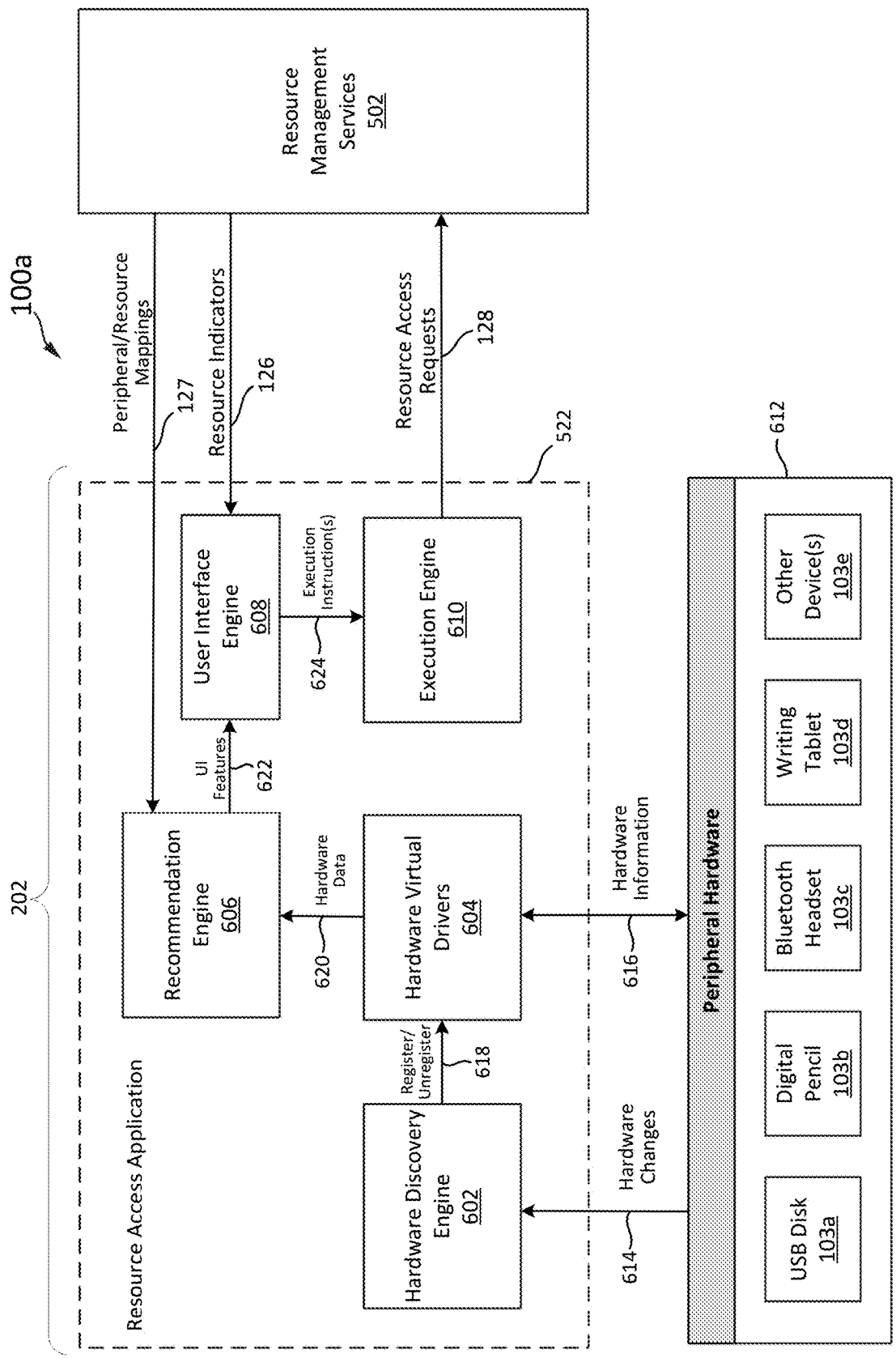
FIG. 6 shows components that may be employed within the client device of the example implementation of the resource recommendation systems shown in FIG. 1B.
Figure 8:
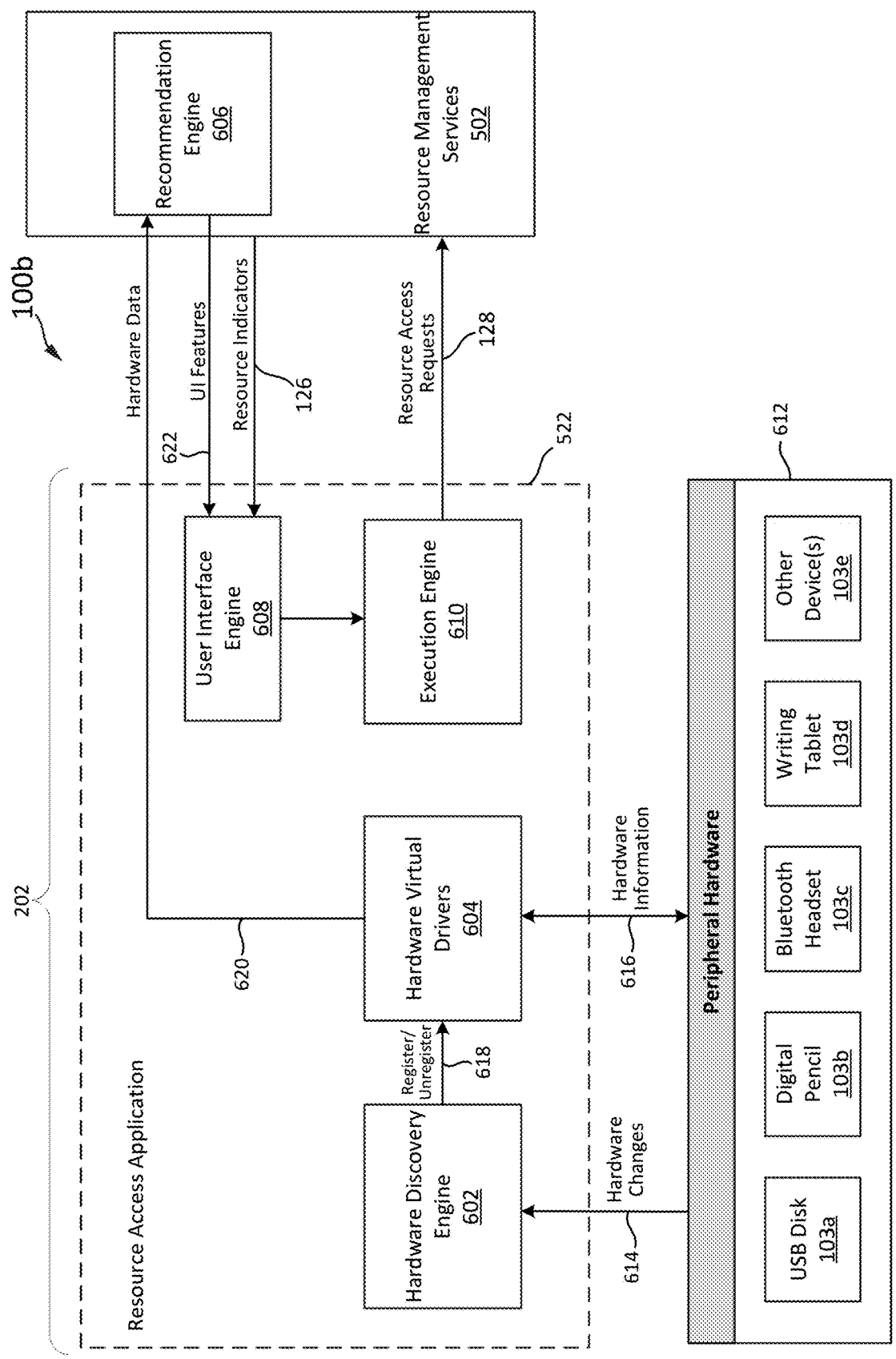
FIG. 8 shows components that may be employed within the client device and the resource management services of the example implementation of the resource recommendation system shown in FIG. 1C.

F. Detailed Description of Example Embodiments of Context-Based Microapp Action Recommendation Systems As noted above in Section A, FIGS. 1B and 1C show two example embodiments of a resource recommendation system 100a, 100b configured in accordance with aspects of the present disclosure. As Section A explains, for the resource recommendation system 100a shown in FIG. 1B, the routine 130a may be performed by one or more applications on the client device 202 (e.g., the resource access application 522 shown in FIGS. 5B and 5C), whereas for the resource recommendation system 100b shown in FIG. 1C, the routine 130b may be performed by one or more server-based applications (e.g., within the resource management services 502 shown in FIGS. 5A-C). FIG. 6 shows example components that may be employed within the resource access application 522 to enable the functionality of the resource recommendation system 100a described in connection with FIG. 1B. FIG. 8, on the other hand, shows example components that may be employed within the resource management services 502 as well as the resource access application 522 to enable the functionality of the resource recommendation system 100b described in connection with FIG. 1C.

As shown in FIG. 6, in some implementations, a resource access application 522, which may be either located on the client device 202 or accessed from a Web server via the a browser on the client device 202, may be configured with a hardware discovery engine 602, a plurality of hardware virtual drivers 604, a recommendation engine 606, a user interface engine 608, and an execution engine 610. As illustrated, various peripheral hardware components 612 may be associated with the client device 202 and may be selectively connected to the client device 202 via one or more physical ports (e.g., USB ports), wireless interfaces (e.g., WiFi or Bluetooth interfaces), or the like. In the example shown, the peripheral hardware 612 includes a number of peripheral devices 103, including a USB disk 103a, a digital pencil 103b, a Bluetooth headset 103c, a writing tablet 103d, as well any number of other peripheral devices 103e.

In some implementations, the hardware discovery engine 602 may be a device manager that listens for messages from the operating system, e.g., as indicated by the arrow 614 in FIG. 6, indicative of state changes to peripheral hardware devices, e.g., uevents from a Linux kernel or WM_DEVICECHANGE messages in a Windows operating system. The hardware virtual drivers 604 may, for example, be included amongst the various client-side virtual drivers (e.g., included in the resource access application 522) that communicate with a server-side application via respective virtual channels, such as the Independent Computing Architecture (ICA) channels that may be established between a Citrix Workspace client application and a Citrix Virtual Apps and Desktops server. The hardware virtual drivers 604 may emulate respective hardware devices so as to enable a server-based operating system and its device drivers to communicate with the hardware virtual drivers 604 as if they are real hardware devices. In some implementations, the resource access application 522 may include separate hardware virtual drivers 604 for different types of peripheral hardware 612 that might be connected to the client device 202. As indicated by an arrow 616 in FIG. 6, the hardware virtual drivers 604 may be configured to communicate with the peripheral hardware 612 to enable the exchange of data between the respective peripheral devices 103a-e and a server-based application, e.g., via respective ICA virtual channels.

As indicated by an arrow 618 in FIG. 6, upon the hardware discovery engine 602 detecting a state change of a peripheral device 103, e.g., in response to a peripheral device 103 being connected to or disconnected from the client device 202, the hardware discovery engine 602 may instruct the hardware virtual drivers 604 to register or unregister the new peripheral device 103 as active, as appropriate.

As indicated by an arrow 620 in FIG. 6, the hardware virtual drivers 604 may send data about the newly-added hardware to the recommendation engine 606 for processing. The hardware data that is sent to the recommendation engine 606 for processing may, for example, identify a specific peripheral device 103 and/or a type of peripheral device 103 that has been newly registered. Further, as indicated adjacent the arrow 616 in FIG. 6, in some implementations, the hardware virtual driver 604 for a newly-registered peripheral device 103 may additionally read information from the peripheral device 103 and include that information in the hardware data it sends to the recommendation engine 606. In some implementations, for example, the hardware information read from the peripheral devices 103 may be indicative of things like the remaining battery life of the device, a list of recently accessed files on the device, etc. In some implementations, the type(s) of hardware information read from the peripheral devices 103 may depend on the nature of those devices. For example, for battery operated devices, the hardware virtual drivers 604 may read information concerning a remaining battery life of the device, and for storage devices, such as USB disks, the hardware virtual drivers 604 may read data identifying a group of the most-recently accessed files that are stored on them.

Additionally or alternatively, in some implementations, the hardware virtual drivers 604 may read information from registered peripheral devices 103 and send that information to the recommendation engine 606 at other times, such as periodically or in response to the occurrence of one or more particular types of events, such as certain types of interactions with the resource access application 522, receipt of a "check hardware" instruction from the resource management services 502, etc. Like the hardware information read when the peripheral devices 103 are first registered, the hardware information read at other times may likewise be included in the hardware data that is sent from the hardware virtual drivers 604 to the recommendation engine 606 (e.g., as indicated by the arrow 620) for processing.

As noted above, the recommendation engine 606 may receive hardware data (e.g., as indicated by the arrow 620) from the hardware virtual drivers 604. And as also noted, that hardware data may identify a specific peripheral device 103 or a type of peripheral device 103 that experienced a state change, e.g., by being newly registered with the hardware virtual drivers 604, and/or may include hardware information (e.g., remaining battery life, a list of recently accessed files, etc.) that was read from a particular peripheral device 103. In response to receiving such hardware data, the recommendation engine 606 may take steps to modify the user interface being presented by the resource access application 522 to present information concerning the peripheral device 103 to which the hardware information relates (e.g., by generating notifications 546 concerning a state change of the peripheral device 103, such as the notifications 546a, 546b, and 546c shown in FIGS. 1B, 1D and 1E) and/or to present one or more selectable user interface elements that, when selected, cause one or more managed resources with which the peripheral device 103 in question can interact to be accessed, such as the selectable user interface elements 108, 110, 112, 114, 118, 120, 122, 124, 144, 146, 148, 150, 152, 154, 156, 158, 160, 162, 162, 166, 168, 170, 172, 174, 176, 178, 180, 182, 184 shown in FIGS. 1A, 1D and 1E.

In some implementations, the recommendation engine 606 may determine whether and/or how to modify the user interface of the resource access application 522 to present such notifications and/or user interface elements based, at least in part, on peripheral/resource mapping data it receives from the resource management services 502 (e.g., as indicated by the arrow 127 in FIG. 6). Such peripheral/resource mapping data may take on any of numerous forms and may be generated in any of a number of ways. In some implementations, for example, the peripheral/resource mapping data may identify, for respective peripheral device types: (A) the manner in which some or all of the data read from the peripheral device is to be presented on the user interface (e.g., within a notification 546a, 546b, 546c), (B) a set of actions for which user interface elements are to be presented in an actions list 106, such as the actions lists 106a, 106b, 106c shown in FIGS. 1A, 1B and 1E, respectively, and/or (C) a set of managed applications for which user interface elements are to be presented in an applications list 116, such as the application lists 116a, 116b, and 116c shown in FIGS. 1A, 1D and 1E, respectively.

In some implementations, the peripheral/resource mapping data may further indicate one or more steps that are to be taken with respect to an accessed resource in response to selection of a user interface element for a particular action. Referring to FIG. 1D, for example, the peripheral/resource mapping data may indicate that, if the peripheral device 103 is a digital pencil, selection of the user interface element 150 is to not only trigger the resource access application 522 to access a drawing application but also cause the drawing application to open the file that was last accessed using that application.

Further, in some implementations, the peripheral/resource mapping data may additionally or alternatively specify one or more rules indicating how particular resources (e.g., applications, microapps, file management systems, etc.) are to interact with particular peripheral device types to complete certain actions indicated by user interface elements. In some implementations, such rules may take into account the hardware information that was read from a particular type of peripheral device. With reference to FIG. 1E, for example, the peripheral/resource mapping data may specify that, if a newly added peripheral device 103 is a storage device, e.g., a USB disk, and one or more files stored on the device are of a type that can be read by an audio player, then a notification 546c indicating that certain files on the storage device can be read by the audio player is to be generated. The peripheral/resource mapping data may further indicate that if such a notification 546c is to be generated, the notification 546c is to include user interface elements 166, 168, 170 corresponding to the three most recently accessed audio files on the storage device, and that selection of one of those user interface elements 166, 168, 170 is to not only trigger the resource access application 522 to access the indicated audio player but also cause the audio player to access the indicated one of the most recently accessed audio files.

In some implementations, one or more tags may additionally or alternatively be applied to one or more of the resource indicators (e.g., as indicated by the arrow 126 in FIG. 6), with such tags identifying one or more peripheral device types with which the indicated resource is capable of interacting. In such implementations, the recommendation engine 606 may take such "peripheral tags" into account when determining the actions and/or applications for which user interface elements are to be presented within the user interface for the resource access application 522 based on detected state changes to the types of peripheral device identified by the tags. For example, the recommendation engine 606 may execute a rule indicating that if an audio headset is newly connected to the client device 202, then user interface elements for actions and/or applications that were assigned an "audio headset" tag (e.g., together with the resource indicators for those applications) are to be included in the applications list 116.

In some implementations, the peripheral/resource mapping data may be generated by a system administrator. In other implementations, the peripheral/resource mapping data may be at least partially computer-generated, e.g., by one or more machine learning (ML) models by accumulating historical data concerning user interactions with the multi-resource access system 500 following peripheral hardware state changes, and identifying one or more actions and/or applications a user is likely to take/access following particular hardware state changes based on that historical data. In some implementations, different sets of peripheral/resource mapping data may be determined for respective user groups, and the peripheral/resource mapping data that is sent to the recommendation engine 606 for a particular user may be determined based on a categorization of that user into a given user group.

As indicated by an arrow 622 in FIG. 6, the various user interface features that are selected and/or generated by the recommendation engine 606, such as the notifications 546a, 546b, and 546c and/or the selectable user interface elements 108, 110, 112, 114, 118, 120, 122, 124, 144, 146, 148, 150, 152, 154, 156, 158, 160, 162, 162, 166, 168, 170, 172, 174, 176, 178, 180, 182, 184 shown in FIGS. 1A, 1D and 1E, may be provided to the user interface engine 608, so as to trigger the user interface engine 608 to include those features in the user interface of the resource access application 522, e.g., as shown in FIGS. 1A, 1D and 1E.

In response to user selection of one of the user interface elements presented by the user interface of the resource access application 522, the user interface engine 608 may instruct the execution engine 610 (e.g., as indicated by an arrow 624 in FIG. 6) to perform one or more steps of the indicated action or to access the indication application. As indicated by the arrow 128 in FIG. 6, in some implementations, to complete the indicated action and/or access the indicated application, the execution engine 610 may send a resource access request to the resource management services 502, thus enabling the client device 202 to access one or more of the applications or other resources managed by the multi-resource access system 500. Several techniques that may be employed by the resource access application 522 and the resource management services 502 to enable client devices 202 to access various types of managed resources are described in detail (in Section E) in connection with FIG. 5B.

Figure 7:
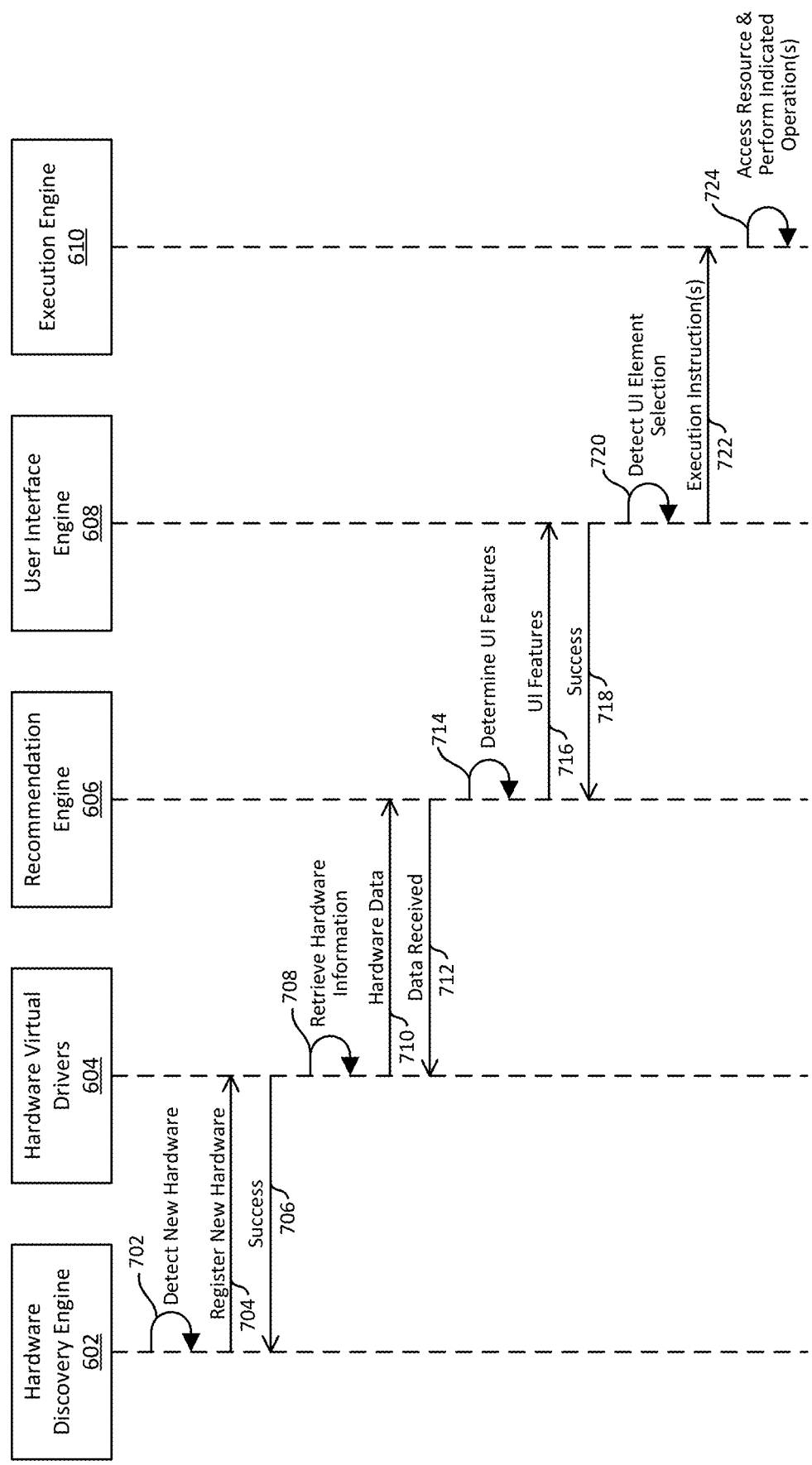
FIG. 7 shows a sequence diagram illustrating example interactions between the components of the resource recommendation system shown in FIG. 6, as well as the resource recommendation shown in FIG. 8.

FIG. 7 is a sequence diagram illustrating how the components shown in FIG. 6 may communicate to achieve the functionality described herein in accordance with some implementations of the present disclosure. As shown, in response to detecting (702) that a new peripheral device 103 has been connected to the client device 202 (e.g., as indicated by the arrow 614 in FIG. 6), the hardware discovery engine 602 may register (704) the newly detected hardware with the hardware virtual drivers 604 (e.g., as indicated by the arrow 618 in FIG. 6). The hardware virtual drivers 604 may notify (706) the hardware discovery engine 602 when the newly detected hardware has been successfully registered.

Next, the hardware virtual drivers 604 may retrieve (708) hardware information from the newly connected peripheral device 103 (e.g., as indicated by the arrow 616 in FIG. 6). As noted above, such hardware information may additionally or alternatively be retrieve at other times, such as periodically or in response to the occurrence of certain events, thus enabling the hardware virtual drivers 604 to discover state changes to the peripheral hardware 612 other than newly-established connections, such as when the remaining battery life of the peripheral device 103 falls below a threshold level.

As shown in FIG. 7, the hardware virtual drivers 604 may send (710) hardware data (described above) to the recommendation engine 606 for processing (e.g., as indicated by the arrow 620 in FIG. 6). The recommendation engine 606 may notify (712) the hardware virtual drivers 604 when it has successfully received the hardware data.

After receiving the hardware data from the hardware virtual drivers 604, the recommendation engine may determine (714) one or more user interface (UI) features to add to the user interface of the resource application, such as the notifications 546a, 546b, and 546c and/or the selectable user interface elements 108, 110, 112, 114, 118, 120, 122, 124, 144, 146, 148, 150, 152, 154, 156, 158, 160, 162, 162, 166, 168, 170, 172, 174, 176, 178, 180, 182, 184 shown in FIGS. 1A, 1D and 1E. The recommendation engine 606 may then send (716) those UI features to the user interface engine 608 (e.g., as indicated by the arrow 622 in FIG. 6), to enable the user interface engine 608 to present them in the user interface of the resource access application 522. The user interface engine 608 may notify (718) the recommendation engine 606 when it has successfully received the UI features.

Upon detecting (720) selection of a user interface element for one of the actions and/or applications, the user interface engine 608 may send (722) one or more instructions to the execution engine 610 (e.g., as indicated by the arrow 624 in FIG. 6), so as to trigger the execution engine to perform the indicated action and/or access the indicated application. As shown, in response to receiving such execution instruction(s), the execution engine 610 may access (724) one or more of the resources managed by the multi-resource access system 500 and, if applicable, perform one or more operations with respect to such resource(s) and/or the peripheral device 103 whose hardware data prompted inclusion of the selected user interface element in the user interface for the resource access application 522.

As noted above, FIG. 8 shows example components that may be included in the resource recommendation system 100b described in connection with FIG. 1C. As shown, in some implementations, the resource recommendation system 100b may be configured substantially identically to the resource recommendation system 100a (described in detail above), with the exception of the location of the recommendation engine 606, and the manner in which messages are exchanged between the recommendation engine 606 and the other illustrated components, e.g., via the Internet rather than between respective modules of the resource access application 522. In particular, in the resource recommendation system 100b, the recommendation engine 606 is remote from the client device 202, e.g., within the resource management services 502, rather than being included within the resource access application 522. The various components in the system 100b shown in FIG. 8 may otherwise serve substantially the same roles and perform substantially the same operations as the similarly labeled components described in connection with FIGS. 6 and 7.

Locating the recommendation engine 606 in a server-based environment may provide certain advantages in terms of the complexity of the processes that may be employed and the extent of the data resources that may be drawn upon to optimize the selection of UI features that are to be included in the user interface of the resource access application 522 based on detected state changes to hardware peripherals of the client device 202. More robust techniques for linking particular peripheral device state changes to one or more actions and/or applications for the resource access application 522 may be possible, or at least more practical, for example, because the peripheral/resource mapping data need not be sent to the client device 202 (e.g., per the arrow 127 in FIG. 6) when the recommendation engine 606 is located within the resource management services 502, as is the case with the resource recommendation system 100b shown in FIG. 8.

G. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves causing a client device to present a user interface for an application, the user interface enabling selective access to a plurality of resources via the client device; determining a state of a peripheral device that is connectable to the client device; identifying, based at least in part on the state of the peripheral device, at least a first resource, from among the plurality of resources, with which the peripheral device can interact; and causing, based at least in part on the identifying of the first resource, the user interface to include at least a first selectable user interface element that, when selected, causes the client device to access to the first resource so as to enable the peripheral device to interact with the first resource.

(M2) A method may be performed as described in paragraph (M1), and may further involve determining the state of the peripheral device at least in part by determining that the peripheral device has become connected to the client device.

(M3) A method may be performed as described in paragraph (M1) or paragraph (M2), and may further involve, in response to detecting selection of the first selectable user interface element, causing the client device to access the first resource, and invoking at least one function of the first resource after the client device has accessed the first resource.

(M4) A method may be performed as described in paragraph (M3), and may further involve invoking the at least one function at least in part by causing the first resource to take at least one action with respect to the peripheral device.

(M5) A method may be performed as described in any of paragraphs (M1) through (M4), wherein the first resource may comprise an application, and the may further involve, in response to detecting selection of the first selectable user interface element, enabling the client device to access the application.

(M6) A method may be performed as described in paragraph (M5), wherein the application may comprise a virtualized application configured to be delivered to the client device, and the method may further involve delivering the virtualized application to the client device over a network.

(M7) A method may be performed as described in any of paragraphs (M1) through (M6), and may further involve determining the state of the peripheral device at least in part by receiving, by a hardware virtual driver configured to emulate the peripheral device, data from the peripheral device.

(M8) A method may be performed as described in paragraph (M7), wherein the first resource may be a virtualized resource configured to interact with the hardware virtual driver.

(M9) A method may be performed as described in paragraph (M8), and may further involve, in response to detecting selection of the first selectable user interface element, causing the virtualized resource to be delivered to the client device such that the peripheral device can interact with the virtualized resource via the hardware virtual driver.

The following paragraphs (S1) through (S9) describe examples of systems and devices that may be implemented in accordance with the present disclosure.

(S1) A system may comprise at least one processor, and at least one computer-readable medium encoded with instructions which, when executed by the at least one processor, cause the system to cause a client device to present a user interface for an application, the user interface enabling selective access to a plurality of resources via the client device, to determine a state of a peripheral device that is connectable to the client device, to identify, based at least in part on the state of the peripheral device, at least a first resource, from among the plurality of resources, with which the peripheral device can interact, and to cause, based at least in part on the identifying of the first resource, the user interface to include at least a first selectable user interface element that, when selected, causes the client device to access to the first resource so as to enable the peripheral device to interact with the first resource.

(S2) A system may be configured as described in paragraph (S1), wherein the at least one computer-readable medium may be further encoded with additional instructions which, when executed by the at least one processor, may further cause the system to determine the state of the peripheral device at least in part by determining that the peripheral device has become connected to the client device.

(S3) A system may be configured as described in paragraph (S1) or paragraph (S2), wherein the at least one computer-readable medium may be further encoded with additional instructions which, when executed by the at least one processor, may further cause the system to, in response to detecting selection of the first selectable user interface element, cause the client device to access the first resource, and invoke at least one function of the first resource after the client device has accessed the first resource.

(S4) A system may be configured as described in paragraph (S3), wherein the at least one computer-readable medium may be further encoded with additional instructions which, when executed by the at least one processor, may further cause the system to invoke the at least one function at least in part by causing the first resource to take at least one action with respect to the peripheral device.

(S5) A system may be configured as described in any of paragraphs (S1) through (S4), wherein the first resource may comprise an application, and the at least one computer-readable medium may be further encoded with additional instructions which, when executed by the at least one processor, may further cause the system to, in response to detecting selection of the first selectable user interface element, enable the client device to access the application.

(S6) A system may be configured as described in paragraph (S5), wherein the application may comprise a virtualized application configured to be delivered to the client device, and the at least one computer-readable medium may be further encoded with additional instructions which, when executed by the at least one processor, may further cause the system to deliver the virtualized application to the client device over a network.

(S7) A system may be configured as described in any of paragraphs (S1) through (S6), wherein the at least one computer-readable medium may be further encoded with additional instructions which, when executed by the at least one processor, may further cause the system to determine the state of the peripheral device at least in part by receiving, by a hardware virtual driver configured to emulate the peripheral device, data from the peripheral device.

(S8) A system may be configured as described in paragraph (S7), wherein the first resource may be a virtualized resource configured to interact with the hardware virtual driver.

(S9) A system may be configured as described in paragraph (S8), wherein the at least one computer-readable medium may be further encoded with additional instructions which, when executed by the at least one processor, may further cause the system to, in response to detecting selection of the first selectable user interface element, cause the virtualized resource to be delivered to the client device such that the peripheral device can interact with the virtualized resource via the hardware virtual driver.

The following paragraphs (CRM1) through (CRM9) describe examples of computer-readable media that may be implemented in accordance with the present disclosure.

(CRM1) At least one non-transitory, computer-readable medium may be encoded with instructions which, when executed by at least one processor included in a computing system, cause the computing system to cause a client device to present a user interface for an application, the user interface enabling selective access to a plurality of resources via the client device, to determine a state of a peripheral device that is connectable to the client device, to identify, based at least in part on the state of the peripheral device, at least a first resource, from among the plurality of resources, with which the peripheral device can interact, and to cause, based at least in part on the identifying of the first resource, the user interface to include at least a first selectable user interface element that, when selected, causes the client device to access to the first resource so as to enable the peripheral device to interact with the first resource.

(CRM2) At least one non-transitory, computer-readable medium may be configured as described in paragraph (CRM1), and may be further encoded with additional instructions which, when executed by the at least one processor, further cause the computing system to determine the state of the peripheral device at least in part by determining that the peripheral device has become connected to the client device.

(CRM3) At least one non-transitory, computer-readable medium may be configured as described in paragraph (CRM1) or paragraph (CRM2), and may be further encoded with additional instructions which, when executed by the at least one processor, further cause the computing system to, in response to detecting selection of the first selectable user interface element, cause the client device to access the first resource, and invoke at least one function of the first resource after the client device has accessed the first resource.

(CRM4) At least one non-transitory, computer-readable medium may be configured as described in paragraph (CRM3), and may be further encoded with additional instructions which, when executed by the at least one processor, further cause the computing system to invoke the at least one function at least in part by causing the first resource to take at least one action with respect to the peripheral device.

(CRM5) At least one non-transitory, computer-readable medium may be configured as described in any of paragraphs (CRM1) through (CRM4), wherein the first resource may comprise an application, and the at least one computer-readable medium may be further encoded with additional instructions which, when executed by the at least one processor, further cause the computing system to, in response to detecting selection of the first selectable user interface element, enable the client device to access the application.

(CRM6) At least one non-transitory, computer-readable medium may be configured as described in paragraph (CRM5), wherein the application may comprise a virtualized application configured to be delivered to the client device, and the at least one computer-readable medium may be further encoded with additional instructions which, when executed by the at least one processor, further cause the computing system to deliver the virtualized application to the client device over a network.

(CRM7) At least one non-transitory, computer-readable medium may be configured as described in any of paragraphs (CRM1) through (CRM6), and may be further encoded with additional instructions which, when executed by the at least one processor, further cause the computing system to determine the state of the peripheral device at least in part by receiving, by a hardware virtual driver configured to emulate the peripheral device, data from the peripheral device.

(CRM8) At least one non-transitory, computer-readable medium may be configured as described in paragraph (CRM7), wherein the first resource may be a virtualized resource configured to interact with the hardware virtual driver.

(CRM9) At least one non-transitory, computer-readable medium may be configured as described in paragraph (CRM8), and may be further encoded with additional instructions which, when executed by the at least one processor, further cause the computing system to, in response to detecting selection of the first selectable user interface element, cause the virtualized resource to be delivered to the client device such that the peripheral device can interact with the virtualized resource via the hardware virtual driver.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    causing a client device to present a user interface for a first application, the user interface enabling selective access to a plurality of accessible applications via the client device; and
    in response to detecting a state change of a peripheral device that is connectable to the client device:
        determining that, as a result of the state change, the peripheral device can be used to interact with at least a second application included among the plurality of accessible applications, and
        causing, based at least in part on the determining that the peripheral device can be used to interact with the second application, the user interface to include at least a first selectable user interface element that, when selected, causes the second application to be launched so as to enable the peripheral device to interact with the second application.

2. The method of claim 1, further comprising:
    detecting the state change of the peripheral device at least in part by determining that the peripheral device has become connected to the client device.

3. The method of claim 1, further comprising:
in response to detecting selection of the first selectable user interface element:
causing the second application to be launched, and invoking at least one function of the second application after the second application has been launched.

4. The method of claim 3, wherein invoking the at least one function comprises:
causing the second application to take at least one action with respect to the peripheral device.

5. The method of claim 1, further comprising:
in response to detecting selection of the first selectable user interface element, causing the second application to be launched.

6. The method of claim 5, wherein the second application comprises a virtualized application configured to be delivered to the client device, and the method further comprises:
delivering the virtualized application to the client device over a network.

7. The method of claim 1, further comprising:
detecting the state change of the peripheral device at least in part by receiving, by a hardware virtual driver configured to emulate the peripheral device, data from the peripheral device.

8. The method of claim 7, wherein:
the second application is a virtualized application configured to interact with the hardware virtual driver.

9. The method of claim 8, further comprising:
in response to detecting selection of the first selectable user interface element, causing the virtualized application to be delivered to the client device such that the peripheral device can interact with the virtualized application via the hardware virtual driver.

10. A system, comprising:
at least one processor; and
at least one computer-readable medium encoded with instructions which, when executed by the at least one processor, cause the system to:
cause a client device to present a user interface for a first application, the user interface enabling selective access to a plurality of accessible applications via the client device;
detect a state change of a peripheral device that is connectable to the client device; and
in response to detecting the state change of the peripheral device:
determine that, as a result of the state change, the peripheral device can be used to interact with at least a second application included among the plurality of accessible applications, and
cause, based at least in part on determining that the peripheral device can be used to interact with the second application, the user interface to include at least a first selectable user interface element that, when selected, causes the second application to be launched so as to enable the peripheral device to interact with the second application.

11. The system of claim 10, wherein the at least one computer-readable medium is further encoded with additional instructions which, when executed by the at least one processor, further cause the system to:
detect the state change of the peripheral device at least on part by determining that the peripheral device has become connected to the client device.

12. The system of claim 10, wherein the at least one computer-readable medium is further encoded with additional instructions which, when executed by the at least one processor, further cause the system to:
in response to detecting selection of the first selectable user interface element:
cause the second application to be launched, and invoke at least one function of the second application after the second application has been launched.

13. The system of claim 12, wherein the at least one computer-readable medium is further encoded with additional instructions which, when executed by the at least one processor, further cause the system to:
invoke the at least one function at least in part by causing the second application to take at least one action with respect to the peripheral device.

14. The system of claim 10, wherein the at least one computer-readable medium is further encoded with additional instructions which, when executed by the at least one processor, further cause the system to:
in response to detecting selection of the first selectable user interface element, causing the second application to be launched.

15. The system of claim 14, wherein the second application comprises a virtualized application configured to be delivered to the client device, and the at least one computer-readable medium is further encoded with additional instructions which, when executed by the at least one processor, further cause the system to:
deliver the virtualized application to the client device over a network.

16. The system of claim 10, wherein the at least one computer-readable medium is further encoded with additional instructions which, when executed by the at least one processor, further cause the system to:
detect the state change of the peripheral device at least in part by receiving, by a hardware virtual driver configured to emulate the peripheral device, data from the peripheral device.

17. The system of claim 16, wherein:
the second application is a virtualized application configured to interact with the hardware virtual driver.

18. The system of claim 17, wherein the at least one computer-readable medium is further encoded with additional instructions which, when executed by the at least one processor, further cause the system to:
in response to detecting selection of the first selectable user interface element, cause the virtualized application to be delivered to the client device such that the peripheral device can interact with the virtualized application via the hardware virtual driver.

19. At least one non-transitory computer-readable medium encoded with instructions which, when executed by at least one processor of a system, cause the system to:
cause a client device to present a user interface for a first application, the user interface enabling selective access to a plurality of accessible applications via the client device;
detect a state change of a peripheral device that is connectable to the client device; and
in response to detecting the state change of the peripheral device:
determine that, as a result of the state change, the peripheral device can be used to interact with at least a second application included among of the plurality of accessible applications, and
cause, based at least in part on determining that the peripheral device can be used to interact with the second application, the user interface to include at least a first selectable user interface element that, when selected, causes the second application to be launched so as to enable the peripheral device to interact with the second application.

20. The at least one non-transitory computer-readable medium of claim 19, further encoded with additional instructions which, when executed by the at least one processor, further cause the system to:

detect the state change of the peripheral device at least on part by determining that the peripheral device has become connected to the client device.

\* \* \* \* \*